US011021970B2

(12) United States Patent
Stuart et al.

(10) Patent No.: US 11,021,970 B2
(45) Date of Patent: Jun. 1, 2021

(54) TURBOMACHINE WITH ALTERNATINGLY SPACED ROTOR BLADES

(71) Applicant: General Electric Company, Schenectady, NY (US)

(72) Inventors: Alan Roy Stuart, Cincinnati, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 16/280,586

(22) Filed: Feb. 20, 2019

(65) Prior Publication Data

US 2020/0263555 A1    Aug. 20, 2020

(51) Int. Cl.
*F01D 5/22* (2006.01)
*F02C 3/06* (2006.01)

(52) U.S. Cl.
CPC .............. *F01D 5/225* (2013.01); *F02C 3/064* (2013.01); *F05B 2240/242* (2013.01); *F05B 2240/33* (2013.01)

(58) Field of Classification Search
CPC ... F01D 5/225; F01D 1/18; F01D 1/20; F01D 1/24; F01D 1/26; F01D 25/24; F01D 5/142; F01D 11/02; F01D 5/06; F01D 5/084; F01D 11/003; F01D 11/00; F01D 25/246; F01D 13/02; F04D 19/024; F04D 19/026; F04D 25/028; F02C 3/064; F02C 7/36; F02C 3/067; F02C 3/06; F02C 3/107; F05B 2240/242; F05B 2240/33; F05D 2260/40311; F05D 2230/60; F05D 2260/37; F05D 2260/36
See application file for complete search history.

(56) References Cited

U.S. PATENT DOCUMENTS

| 3,363,831 | A | 1/1968 | Garnier |
| 3,703,081 | A | 11/1972 | Krebs et al. |
| 4,098,127 | A | 7/1978 | Shiga et al. |
| 4,621,978 | A | 11/1986 | Stuart |
| 4,860,537 | A | 8/1989 | Taylor |
| 4,879,792 | A | 11/1989 | O'Connor |
| 4,969,325 | A | 11/1990 | Adamson et al. |
| 4,976,102 | A | 12/1990 | Taylor |
| 5,167,167 | A | 12/1992 | Tiernan, Jr. et al. |
| 5,272,868 | A | 12/1993 | Ciokajlo et al. |
| 5,537,861 | A | 7/1996 | Seitelman et al. |
| 5,724,271 | A | 3/1998 | Bankert et al. |
| 6,126,391 | A | 10/2000 | Atraghji et al. |
| 6,619,030 | B1 | 9/2003 | Seda et al. |

(Continued)

*Primary Examiner* — Aaron R Eastman
(74) *Attorney, Agent, or Firm* — Dority & Manning, P.A.

(57) ABSTRACT

A method includes installing a first stage assembly including a first ring member and a first stage of rotor blades, the first ring member defining a first end and the first stage of rotor blades defining a second end; installing a second stage assembly including a second ring member and a second stage of rotor blades, the second ring member defining a first end and the second stage of rotor blades defining a second end, wherein installing the second stage assembly includes fitting the first end of the second ring member to the second end of the first stage of rotor blades to form a first attachment interface; and pressing the second stage assembly against the first stage assembly to fix the first attachment interface.

20 Claims, 11 Drawing Sheets

(56) References Cited

U.S. PATENT DOCUMENTS

| | | |
|---|---|---|
| 6,666,017 B2 | 12/2003 | Prentice et al. |
| 6,739,120 B2 | 5/2004 | Moniz et al. |
| 6,976,679 B2 | 12/2005 | Goss et al. |
| 7,195,446 B2 | 3/2007 | Seda et al. |
| 7,458,202 B2 | 12/2008 | Moniz et al. |
| 7,490,461 B2 | 2/2009 | Moniz et al. |
| 7,493,753 B2 | 2/2009 | Moniz et al. |
| 7,854,584 B2 | 12/2010 | Lusted et al. |
| 7,905,083 B2 | 3/2011 | Orlando et al. |
| 7,921,634 B2 | 4/2011 | Orlando et al. |
| 7,937,927 B2 | 5/2011 | Suciu et al. |
| 7,966,806 B2 | 6/2011 | Henry et al. |
| 8,172,512 B2 | 5/2012 | Short et al. |
| 8,736,120 B2 | 5/2014 | Maeda et al. |
| 8,784,045 B2 | 7/2014 | Zoric et al. |
| 8,887,564 B2 | 11/2014 | Harrison |
| 8,950,171 B2 | 2/2015 | Suciu et al. |
| 9,028,200 B2 | 5/2015 | Suciu et al. |
| 9,080,512 B2 | 7/2015 | Suciu et al. |
| 9,217,331 B1 | 12/2015 | Yellapragada et al. |
| 9,525,321 B2 | 12/2016 | Yamanaka et al. |
| 9,689,314 B2 | 6/2017 | Lemarchand et al. |
| 9,695,751 B2 | 7/2017 | Kupratis et al. |
| 9,718,536 B2 | 8/2017 | Danielson et al. |
| 9,885,249 B2 | 2/2018 | Munsell et al. |
| 1,004,760 A1 | 8/2018 | Phylip-Jones et al. |
| 1,006,035 A1 | 8/2018 | Adams et al. |
| 2010/0196139 A1 | 8/2010 | Beeck et al. |
| 2016/0298539 A1 | 10/2016 | Roberge |
| 2016/0298751 A1 | 10/2016 | Mccune |
| 2017/0314418 A1 | 11/2017 | Lighty et al. |
| 2018/0058569 A1 | 3/2018 | Slayter et al. |
| 2018/0094589 A1 | 4/2018 | Auker et al. |
| 2018/0128168 A1 | 5/2018 | Suciu et al. |
| 2018/0141643 A1 | 5/2018 | Fages |
| 2018/0163845 A1 | 6/2018 | van der Merwe et al. |
| 2018/0209290 A1 | 7/2018 | Port |
| 2018/0209335 A1 | 7/2018 | Stuart et al. |
| 2018/0223732 A1 | 8/2018 | Clements et al. |
| 2018/0238232 A1* | 8/2018 | Reynolds ............... F23R 3/002 |
| 2018/0274527 A1 | 9/2018 | Snell |

\* cited by examiner

TURBOMACHINE WITH ALTERNATINGLY SPACED ROTOR BLADES

FIELD

The present subject matter relates generally to a turbomachine a turbomachine having alternatingly spaced rotor blades and a method for assembling the same.

BACKGROUND

Gas turbine engines generally include a turbine section downstream of a combustion section that is rotatable with a compressor section to rotate and operate the gas turbine engine to generate power, such as propulsive thrust. Certain gas turbine engines further include a fan driven by a turbine within the turbine section, such as a low pressure turbine of the turbine section.

In order to increase an efficiency of the gas turbine engine, at least certain recent gas turbine engines include one or more counter-rotating compressors and turbines. With such a configuration, a plurality of stages of first speed rotor blades may be assembled first. A plurality of stages of second speed rotor blades may then be installed between adjacent stages of first speed rotor blades. Each stage of the second speed rotor blades may be installed as, e.g., a top half and a bottom half, bolted together. However, such a configuration may result in the stages of second speed rotor blades not having a completely symmetric shape along a circumferential direction of the gas turbine engine, which may result in issues associated with thermal expansion, centrifugal forces, etc.

Accordingly, a gas turbine engine with a counter-rotating compressor or turbine that allows for a plurality of stages of first speed and second speed rotor blades having symmetric shape would be useful.

BRIEF DESCRIPTION

Aspects and advantages of the invention will be set forth in part in the following description, or may be obvious from the description, or may be learned through practice of the invention.

In one exemplary aspect of the present disclosure a method is provided of assembling a compressor or a turbine of a gas turbine engine defining an axial direction, a radial direction, and a circumferential direction. The method includes installing a first stage assembly including a first ring member and a first stage of rotor blades, the first ring member defining a first end and the first stage of rotor blades defining a second end; installing a second stage assembly including a second ring member and a second stage of rotor blades, the second ring member defining a first end and the second stage of rotor blades defining a second end, wherein installing the second stage assembly includes fitting the first end of the second ring member to the second end of the first stage of rotor blades to form a first attachment interface; and pressing the second stage assembly against the first stage assembly to fix the first attachment interface.

In certain exemplary aspects pressing the second stage assembly against the first stage assembly includes clamping the second stage assembly against the first stage assembly using a rotating outer drum assembly extending from at least the first stage assembly to at least the second stage assembly.

In certain exemplary aspects the first ring member further defines a second end, wherein the first stage of rotor blades includes a plurality of segments of one or more first stage rotor blades, wherein each segment of one or more first stage rotor blades includes an outer platform extending between a first end and a second end generally along the axial direction, and wherein installing the first stage assembly includes fitting the first end of the outer platform of each segment of one or more first stage rotor blades with the second end of the first ring member to form a stage assembly attachment interface.

For example, in certain exemplary aspects the first ring member defines a first span along the circumferential direction, wherein the outer platform of each segment of one or more first stage rotor blades defines a second span along the circumferential direction, and wherein the first span is greater than the second span.

For example, in certain exemplary aspects the segment of one or more first stage rotor blades is a segment of at least two rotor blades and up to fifteen rotor blades.

For example, in certain exemplary aspects fitting the first end of the outer platform of each segment of one or more first stage rotor blades with the second end of the first ring member includes installing the plurality of segments of one or more first stage rotor blades sequentially.

For example, in certain exemplary aspects the second ring member further defines a second end, wherein the second stage of rotor blades includes a plurality of segments of one or more second stage rotor blades, wherein each segment of one or more second stage rotor blades includes an outer platform extending between a first end and a second end generally along the axial direction, and wherein installing the second stage assembly includes fitting the first end of the outer platform of each segment of one or more second stage rotor blades with the second end of the second ring member to form a second stage assembly attachment interface.

In certain exemplary aspects the attachment interface is configured as a tongue and groove attachment interface.

In certain exemplary aspects the first stage of rotor blades is a first stage of first speed rotor blades, wherein the second stage of rotor blades is a second stage of first speed rotor blades, wherein the gas turbine engine further includes a first stage of second speed rotor blades and a second stage of second speed rotor blades, wherein the first ring member is positioned outward of the first stage of second speed rotor blades along the radial direction, and wherein the second ring member is positioned outward of the second stage of second speed rotor blades along the radial direction.

In certain exemplary aspects the first stage of rotor blades is a first stage of first speed rotor blades, wherein the gas turbine engine further includes a first stage of second speed rotor blades, wherein the first stage of first speed rotor blades is configured to rotate in a first circumferential direction, and wherein the first stage of second speed rotor blades is configured to rotate in a second circumferential direction opposite the first circumferential direction.

In an exemplary embodiment of the present disclosure, a gas turbine engine is provided defining an axial direction, a radial direction, and a circumferential direction. The gas turbine engine includes a compressor and a turbine; and a rotor blade assembly positioned in the compressor or the turbine. The rotor blade assembly includes a first stage assembly including a first ring member and a first stage of rotor blades, the first ring member defining a first end and the first stage of rotor blades defining a second end; a second stage assembly including a second ring member and a second stage of rotor blades, the second ring member defining a first end and the second stage of rotor blades defining a second end, the second end of the first stage of rotor blades and the first end of the second ring member together forming an attachment interface; and a drum member positioned outward of the first and second stage assemblies along the radial direction and clamping the first stage assembly against the second stage assembly.

In certain exemplary embodiments the first ring member further defines a second end, wherein the first stage of rotor blades includes a plurality of segments of one or more first stage rotor blades, wherein each segment of one or more rotor blades includes an outer platform extending between a first end and a second end generally along the axial direction, and wherein the first end of the outer platform of each segment of one or more rotor blades forms a stage assembly attachment interface with the second end of the first ring member.

For example, in certain exemplary embodiments the second end of the first stage assembly is formed of the second ends of the outer platforms of the plurality of segments of one or more first stage rotor blades.

For example, in certain exemplary embodiments the first ring member extends completely along the circumferential direction.

For example, in certain exemplary embodiments each segment of one or more rotor blades includes at least 2 rotor blades and up to 15 rotor blades.

For example, in certain exemplary embodiments the stage assembly attachment interface is configured as a tongue and groove attachment interface.

For example, in certain exemplary embodiments the second ring member further defines a second end, wherein the second stage of rotor blades includes a plurality of segments of one or more second stage rotor blades, wherein each segment of one or more second stage rotor blades includes an outer platform extending between a first end and a second end generally along the axial direction, and wherein the first end of the outer platform of each segment of one or more second stage rotor blades forms a stage assembly attachment interface with the second end of the second ring member.

In certain exemplary embodiments the first stage of rotor blades is a first stage of first speed rotor blades, wherein the second stage of rotor blades is a second stage of first speed rotor blades, wherein the gas turbine engine further includes a first stage of second speed rotor blades and a second stage of second speed rotor blades, wherein the first ring member is positioned outward of the first stage of second speed rotor blades along the radial direction, and wherein the second ring member is positioned outward of the second stage of second speed rotor blades along the radial direction.

For example, in certain exemplary embodiments the first ring member surrounds the first stage of second speed rotor blades along the circumferential direction, and wherein the second ring member surrounds the second stage of second speed rotor blades along the circumferential direction.

In certain exemplary embodiments first stage of rotor blades is a first stage of first speed rotor blades, wherein the second stage of rotor blades is a second stage of first speed rotor blades, wherein the gas turbine engine further includes a plurality of second speed rotor blades coupled to a first section of second speed rotor disks and a second section of second speed rotor disks, and wherein the rotor blade assembly further includes a blisk coupled to one of the first stage assembly or the second stage assembly and positioned between the first and second sections of second speed rotor disks along the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
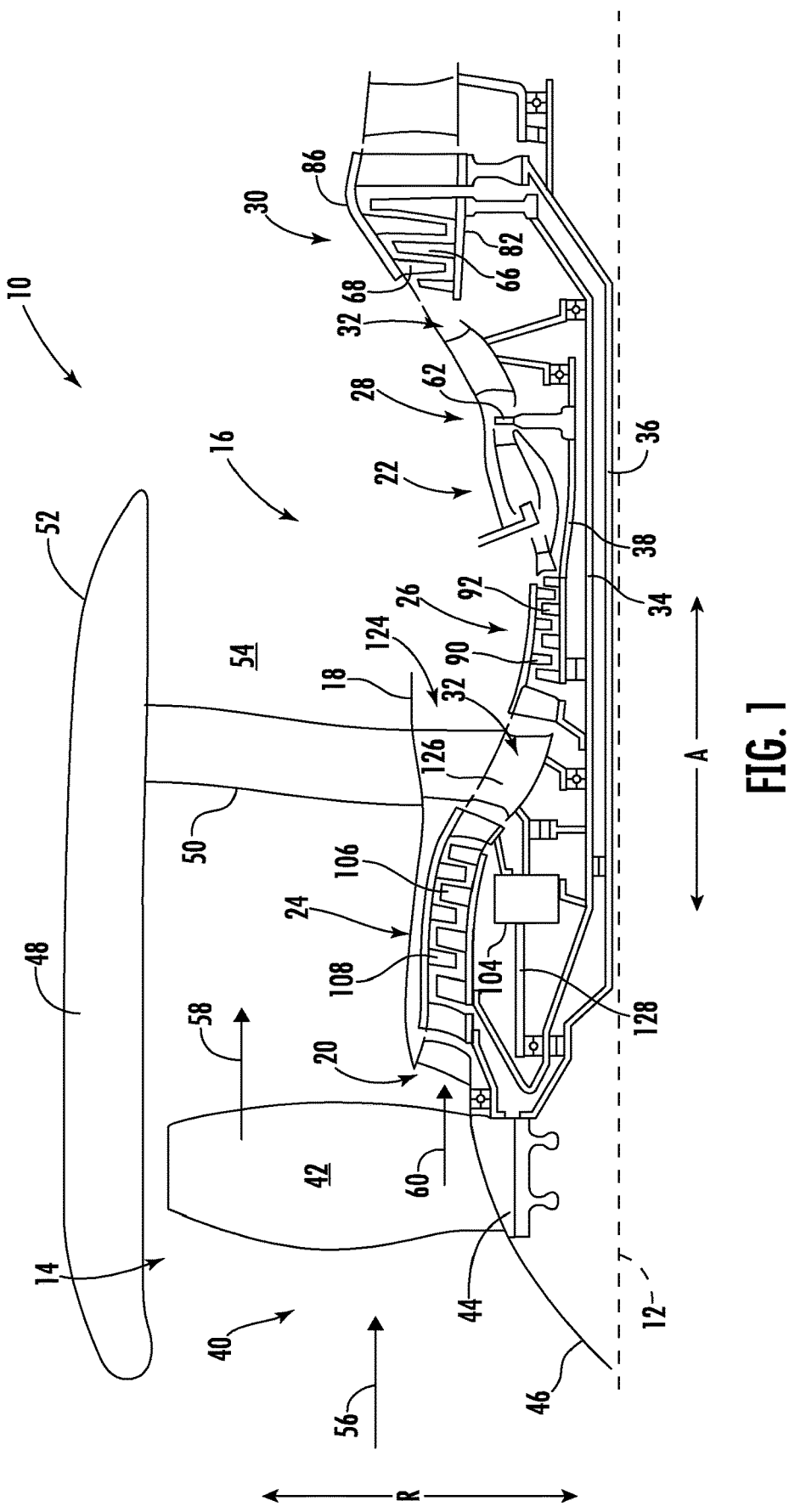
FIG. 1 is a schematic cross sectional view of an exemplary gas turbine engine incorporating exemplary aspects of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a gas turbine engine, such as a turbofan engine, having a compressor, a turbine, and a rotor blade assembly positioned in the compressor or the turbine. The rotor blade assembly may include a plurality of sequentially arranged stage assemblies, with each stage assembly including a stage of rotor blades. Notably, in at least certain embodiments, the rotor blade assembly may be a first speed rotor blade assembly, the stage assemblies may be first speed stage assemblies including first speed rotor blades, and the turbine or compressor may further include a second rotor blade assembly having a plurality of sequentially arranged second speed stage assemblies, with each second speed stage assembly including a stage of second speed rotor blades. The stages of first speed rotor blades and stages of second speed rotor blades may be alternatingly spaced and configured to counterrotate during operation. Further, the second rotor blade assembly may be fully or partially assembled prior to the installation of the first rotor blade assembly.

More specifically, the first rotor blade assembly is configured to allow for installation into a fully or partially assembled second rotor blade assembly, while maintaining a substantially symmetrical shape along a circumferential direction once installed. Generally, the first rotor blade assembly includes a first stage assembly and a second stage assembly. A first end of the second stage assembly is configured to be fitted against a second end of the first stage assembly (e.g., at their respective radially outer ends) during installation. A drum member positioned outward of the first and second stage assemblies to clamp the first and second stage assemblies together.

More specifically, the first and second stage assemblies each include a circumferential ring member and a plurality of rotor blades grouped into segments. During installation, the ring member of the first stage assembly may be moved into place along the axial direction, and subsequently each of the plurality of segments of rotor blades of the first stage assembly may then be fitted against the ring member of the first stage assembly. Subsequently, the ring member of the second stage assembly may be moved into place along the axial direction and fitted against the plurality of segments of rotor blades of the first stage assembly. In such a manner, the second ring member may hold the plurality of segments of rotor blades of the first stage assembly in position. The plurality of segments of rotor blades of the second stage assembly may subsequently be installed in a manner similar to the segments of rotor blades of the first stage assembly. Additional stage assemblies of the rotor blade assembly may be sequentially installed in a similar manner until each of the stage assemblies are in position. The rotating outer drum may then be installed, extending from a forward-most stage assembly to an aft most stage assembly and clamping each of stage assemblies together and holding them in position during operation of the gas turbine engine.

Referring now to the drawings, wherein identical numerals indicate the same elements throughout the Figs., FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 3). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. Although only a portion of the outer casing 18 is depicted in FIG. 1, it will generally be appreciated that the outer casing 18 encases, in serial flow relationship, a compressor section including a compressor, a combustion section 22 including a combustor, and a turbine section including a turbine. More specifically, for the embodiment shown, the compressor section includes a low pressure (LP) compressor 24 and a high pressure (HP) compressor 26, with the HP compressor 26 located downstream of the LP compressor 24; and the turbine section includes a high pressure (HP) turbine 28 and a low pressure (LP) turbine 30, with the LP turbine 30 located downstream of the HP turbine 28. The compressor section, combustion section 22, and turbine section together define a core air flowpath 32 extending from the annular inlet 20 through the LP compressor 24, HP compressor 26, combustion section 22, HP turbine 28, and LP turbine 30.

As will be explained in greater detail below, the exemplary turbofan engine 10 depicted is a three-speed turbofan engine. For example, one or more of the turbines and compressors within the turbine section and compressor section, respectively, include: rotor blades rotating at a first speed, which may generally be an intermediate-speed; rotor blades rotating at a second speed, which may generally be a low-speed; and a rotor blades rotating at a third speed, which may generally be a high-speed. As such, it will be appreciated that the exemplary turbofan engine depicted generally also includes a first spool, or intermediate-speed spool 34, a second spool, or low-speed spool 36, and a third spool, or high-speed spool 38.

It will be appreciated that as used herein, the terms "high pressure" and "low pressure" are generally relative terms, and do not refer to or require any specific pressure or pressure ratio. Similarly, it will be appreciated that as used herein, the terms "high-speed," "low-speed," and "intermediate-speed" are also generally relative terms, and do not refer to or require any specific rotational speed.

Referring still to FIG. 1, for the embodiment depicted, the fan section 14 includes a fan having a plurality of fan blades 42 coupled to a disk 44 in a spaced apart manner. As depicted, the fan blades 42 extend outwardly from the disk 44 generally along the radial direction R. The fan blades 42 and disk 44 are together rotatable about the longitudinal axis 12. As will be explained in greater detail below, for the embodiment shown, the fan blades 42 and disk 44 are together rotatable about the longitudinal axis 12 by the low-speed spool 36 and the intermediate-speed spool 34.

Additionally, the disk 44 is covered by rotatable spinner cone 46 aerodynamically contoured to promote an airflow through the plurality of fan blades 42. The exemplary fan section 14 includes an annular fan casing or outer nacelle 48 that circumferentially surrounds the fan 40 and/or at least a portion of the turbomachine 16. The nacelle 48 is supported relative to the turbomachine 16 by a plurality of circumferentially-spaced outlet guide vanes 50. Moreover, a downstream section 52 of the nacelle 48 extends over an outer portion of the turbomachine 16 so as to define a bypass airflow passage 54 therebetween.

During operation of the turbofan engine 10, a volume of air 56 enters the turbofan 10 through an associated inlet of the nacelle 48 and/or fan section 14. As the volume of air 56 passes across the fan blades 42, a first portion of the air 56 as indicated by arrows 58 is directed or routed into the bypass airflow passage 54 and a second portion of the air 56 as indicated by arrow 60 is directed or routed into turbomachine 16. The ratio between the first portion of air 58 and the second portion of air 60 is commonly known as a bypass ratio. The pressure of the second portion of air 60 is then increased as it is routed through the LP compressor 24 and HP compressor 26 and into the combustion section 22, where it is mixed with fuel and burned to provide combustion gases through the turbine section. Operation of the compressor section will be discussed in greater detail below, with reference to, e.g., FIG. 4.

Figure 2:
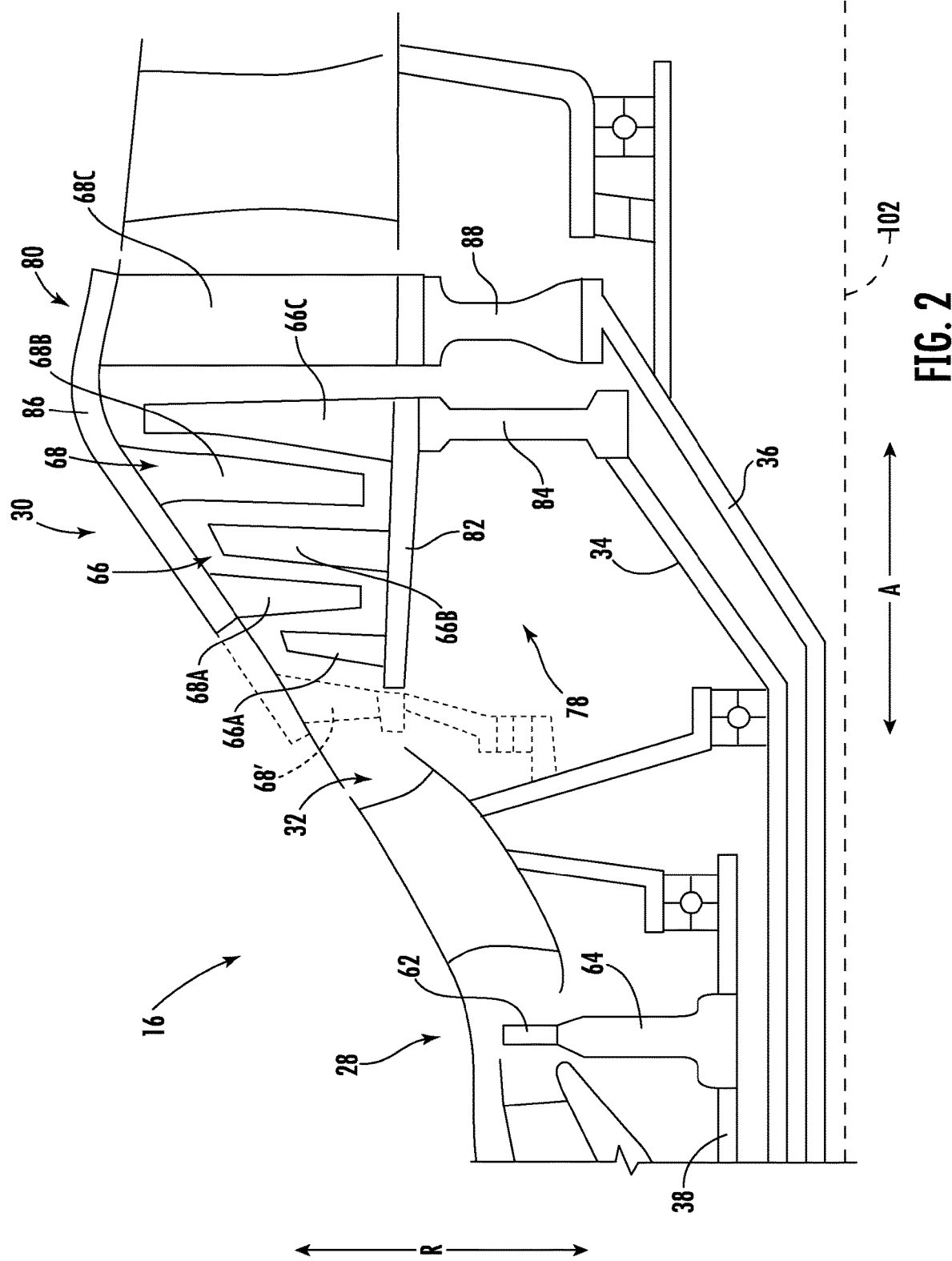
FIG. 2 is a close-up, schematic, cross sectional view of a turbine section of the exemplary gas turbine engine of FIG. 1.

Referring still to FIG. 1, and now also to FIG. 2, providing a close-up view of the turbine section of the exemplary turbofan engine 10 of FIG. 1, the HP turbine 28 includes a plurality of high-speed HP turbine rotor blades 62. More specifically, for the embodiment shown, the HP turbine 28 is a single stage turbine, including a single stage of high-speed HP turbine rotor blades 62. Each of the plurality of high-speed HP turbine rotor blades 62 are coupled to a rotor disk 64, which in turn is coupled to the high-speed spool 38. In such a manner, it will be appreciated that the plurality of high-speed HP turbine rotor blades 62 may extract energy from combustion gases from the combustion section 22 during operation and transfer such energy to the high-speed spool 38, such that the high-speed spool 38 is rotatable by the high-speed HP turbine rotor blades 62 of the HP turbine 28 and may drive operations within the compressor section, as is discussed below.

The combustion gases are then routed through the LP turbine 30 where a second portion of thermal and kinetic energy is extracted from the combustion gases via sequential stages of LP turbine rotor blades. Notably, for the embodiment shown, the LP turbine 30 includes a plurality of first speed LP turbine rotor blades and a plurality of second speed LP turbine rotor blades. The plurality of first speed turbine rotor blades of the LP turbine is configured to rotate in an opposite circumferential direction than the plurality of second speed LP turbine rotor blades. More specifically, for the embodiment shown the plurality of first speed LP turbine rotor blades is a plurality of intermediate-speed LP turbine rotor blades 66, and the plurality of second speed LP turbine rotor blades is a plurality of low-speed LP turbine rotor blades 68. As such, the plurality of intermediate-speed LP turbine rotor blades 66 may be coupled to the intermediate-speed spool 34, such that the intermediate-speed spool 34 is rotatable by the plurality of intermediate-speed LP turbine rotor blades 66. Similarly, the plurality of low-speed LP turbine rotor blades 68 is coupled to the low-speed spool 36, such that the low-speed spool 36 is rotatable by the plurality of low-speed LP turbine rotor blades 68.

Figure 3:
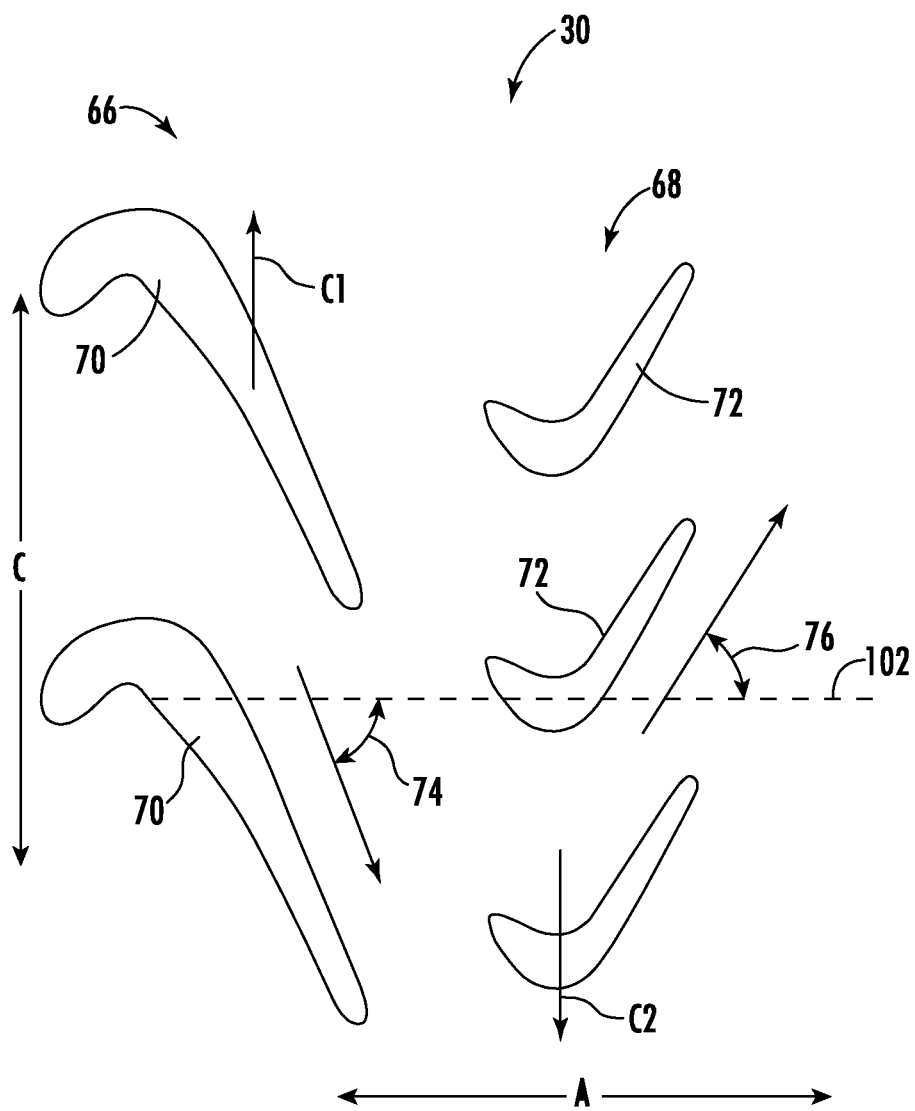
FIG. 3 is a cross sectional view depicting exemplary blade pitch angles of a turbine of a turbine section in accordance with an exemplary embodiment of the present disclosure.

More specifically, referring briefly to FIG. 3, an orientation of the plurality of intermediate-speed LP turbine rotor blades 66 and low-speed LP turbine rotor blades 68 is generally provided. More specifically, still, the embodiment of FIG. 3 generally depicts a first stage of the plurality of intermediate-speed LP turbine rotor blades 66 and a first stage of the plurality of low-speed LP turbine rotor blades 68. In the embodiment shown, the intermediate-speed LP turbine rotor blades 66 are configured to rotate in a first circumferential direction C1, while the low-speed LP turbine rotor blades 68 are configured to rotate in a second circumferential direction C2. It should be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

Referring still to FIG. 3, it will further be appreciated that for the embodiment depicted, each turbine rotor blade of the intermediate-speed LP turbine rotor blades 66 includes an airfoil 70, and similarly, each turbine rotor blade of the low-speed LP turbine rotor blades 68 includes an airfoil 72. The airfoils 70 each define an exit angle 74, and similarly the airfoils 72 each define an exit angle 76. The exit angles 74, 76 of the airfoils 70, 72, respectively, as well as the pressure and suction sides (not labeled) of such airfoils 70, 72, respectively, and other features of the turbofan engine 10, may cause the intermediate-speed LP turbine rotor blades 66 and the low-speed LP turbine rotor blades 68 to rotate in the first and second circumferential directions C1, C2, respectively. It will be appreciated, however, that in other embodiments, the airfoils 70, 72 may have any other suitable configuration.

Referring now back to FIGS. 1 and 2, it will further be appreciated that the plurality of intermediate-speed LP turbine rotor blades 66 and the plurality of low-speed LP turbine rotor blades 68 are alternatingly spaced along the axial direction A of the turbofan engine 10. As used herein, the term "alternatingly spaced along the axial direction A" refers to the plurality of intermediate-speed LP turbine rotor blades 66 including at least one turbine rotor blade positioned along the axial direction A between two axially spaced turbine rotor blades of the plurality of low-speed LP turbine rotor blades 68. For example, for the embodiment depicted, the plurality of intermediate-speed LP turbine rotor blades 66 includes three sequential stages of intermediate-speed LP turbine rotor blades 66, and similarly, the plurality of low-speed LP turbine rotor blades 68 includes three sequential stages of low-speed LP turbine rotor blades 68. A first stage of intermediate-speed LP turbine rotor blades 66A is positioned forward of the plurality of low-speed LP turbine rotor blades 68, a second stage of intermediate-speed LP turbine rotor blades 66B is positioned between a first stage of low-speed LP turbine rotor blades 68A and a second stage of low-speed LP turbine rotor blades 68B along the axial direction A, and a third stage of intermediate-speed LP turbine rotor blades 66C is positioned between the second stage of low-speed LP turbine rotor blades 68B and a third stage of low-speed LP turbine rotor blades 68C along the axial direction A. It will be appreciated, however, that in other exemplary embodiments, the intermediate-speed LP turbine rotor blades 66 and low-speed LP turbine rotor blades 68 may be arranged in any other suitable, alternatingly spaced manner and including any suitable number of stages of turbine rotor blades.

Furthermore, for the embodiment shown, each of the plurality of stages of intermediate-speed LP turbine rotor blades 66 are coupled to a first LP turbine connection assembly 78 and each of the plurality of stages of low-speed LP turbine rotor blades 68 are coupled to a second LP turbine connection assembly 80. Each of the plurality of intermediate-speed LP turbine rotor blades 66 are coupled to the first LP turbine connection assembly 78 at their respective radially inner ends, and similarly, each of the plurality of low-speed LP turbine rotor blades 68 are coupled to the second LP turbine connection assembly 80 at their respective radially outer ends. More specifically, for the embodiment shown the first LP turbine connection assembly 78 includes an inner drum 82 and at least one rotor disk 84, with each of the plurality of intermediate-speed rotor blades of the LP turbine 30 coupled at a respective radially inner ends to the inner drum 82 and the inner drum coupled to the at least one rotor disk 84. Similarly, the second LP turbine connection assembly 80 includes an outer drum 86 and at least one rotor disk 88, with each of the plurality of low-speed LP turbine rotor blades 68 coupled at their respective radially outer ends to the outer drum 86 and the outer drum 86 couple to the at least one rotor disk 88 (through the third stage of low-speed LP turbine rotor blades 68C for the embodiment shown).

It will be appreciated, however, that the mounting/coupling configuration of the LP turbine 30 is provided by way of example only. In other exemplary embodiments, the first LP turbine connection assembly 78 and/or second LP turbine connection assembly 80 may have any other suitable configuration. For example, in other embodiments, one or both of the first LP turbine connection assembly 78 and second LP turbine connection assembly 80 may include any other suitable number of rotor discs, blisks, drums, etc., and may be coupled to the adjacent stages at their respective inner ends or outer ends.

Figure 4:
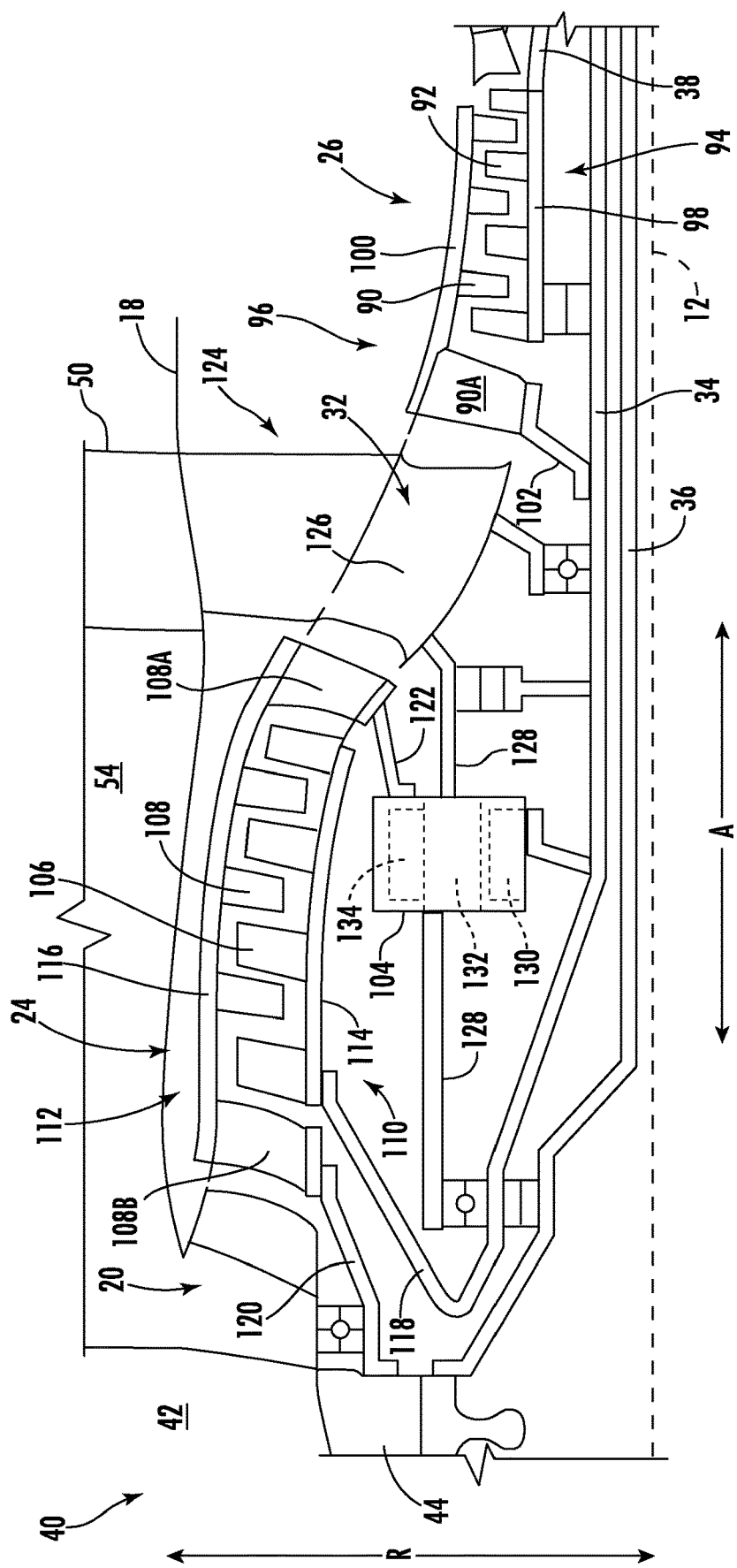
FIG. 4 is a close-up, schematic, cross sectional view of a compressor section of the exemplary gas turbine engine of FIG. 1.

Referring now still to FIG. 1 and now also to FIG. 4, operation of the compressor section and fan section 14 of the exemplary turbofan engine 10 will be described in greater detail.

As noted, the compressor section includes the LP compressor 24 and the HP compressor 26. In addition, the turbomachine 16 includes a gearbox 104. Referring first specifically to the LP compressor 24, the LP compressor 24 generally includes a plurality of first speed LP compressor rotor blades and a plurality of second speed LP compressor rotor blades. The plurality of first speed LP compressor rotor blades is, for the embodiment shown, a plurality of intermediate-speed LP compressor rotor blades 106, and the plurality of second speed LP compressor rotor blades is, for the embodiment shown a plurality of low-speed LP compressor rotor blades 108. The intermediate-speed spool 34 is coupled to the plurality of intermediate-speed LP compressor rotor blades 106 for driving the plurality of intermediate-speed LP compressor rotor blades 106 in a first direction. The intermediate-speed spool 34 is further coupled to the plurality of low-speed LP compressor rotor blades 108 across the gearbox 104 for driving the plurality of low-speed LP compressor rotor blades 108 in a second direction, the second direction being opposite the first direction. In such a manner, the LP compressor 24 may also be referred to as a counterrotating LP compressor, e.g., with the plurality of intermediate-speed LP compressor rotor blades 106 and plurality of low-speed LP compressor rotor blades 108 configured in a similar manner as the intermediate-speed and low-speed LP turbine rotor blades 66, 68 depicted in FIG. 3. For example, the first direction may be the same as the first circumferential direction C1 discussed above with reference to FIG. 3, and similarly, the second direction may be the same as the second circumferential direction C2 discussed above with reference to FIG. 3.

As with the counterrotating LP turbine 30, the plurality of intermediate-speed LP compressor rotor blades 106 and low-speed LP compressor rotor blades 108 are alternatingly spaced along the axial direction A. Additionally, for the embodiment shown, the LP compressor 24 includes a first LP compressor connection assembly 110 for coupling each of the plurality of intermediate-speed LP compressor rotor blades 106 and a second LP compressor connection assembly 112 for coupling each of the plurality of low-speed LP compressor rotor blades 108. The first LP compressor connection assembly 110 generally includes an inner drum 114, with each of the plurality of intermediate-speed LP compressor rotor blades 106 coupled to the inner drum 114 at their respective radially inner ends, and similarly, the second LP compressor connection assembly 112 generally includes an outer drum 116, with each of the plurality of low-speed LP compressor rotor blades 108 coupled to the outer drum 116 at their respective radially outer ends.

More specifically, the first LP compressor connection assembly 110 further includes an intermediate-speed connection member 118 extending between the inner drum 82 and the intermediate-speed spool 34 and the second LP compressor connection assembly 112 further includes a forward low-speed connection member 120 and an aft low-speed connection member 122. Moreover, it will be appreciated that the turbofan engine 10 further includes a frame assembly 124, with the frame assembly 124 including a strut 126 (or rather a plurality of struts 126 spaced along the circumferential direction) extending through the core air flowpath 32 at a location downstream of the LP compressor 24 and upstream of the HP compressor 26. The frame assembly 124 further includes a frame member 128 coupled to the strut 126 and extending forward. The frame member 128, for the embodiment shown, and as will be discussed in greater detail below, extends through the gearbox 104 and is configured for mounting the gearbox 104 to the frame assembly 124. The intermediate-speed connection member 118 of the first LP compressor connection assembly 110 extends from the intermediate-speed spool 34 forward and around the frame member 128 to connect inner drum 114 (and the plurality of intermediate-speed LP compressor rotor blades 108) to the intermediate-speed spool 34.

The gearbox 104 generally includes a first gear, a second gear, and a third gear. More specifically, the gearbox 104 is generally configured as a planetary gear box, such that the first gear is a sun gear 130, the second gear is a planet gear 132 (or rather, a plurality of planet gears 132) and the third gear is a ring gear 134. As noted above, the plurality of low-speed LP compressor rotor blades 108 are driven by the intermediate-speed spool 34 across the gearbox 104. More specifically, the intermediate-speed spool 34 directly rotates the sun gear 130, and the aft low-speed connection member 122 couples the plurality of low-speed LP compressor rotor blades 108 to the ring gear 134, such that the ring gear 134 directly rotates the plurality of low-speed LP compressor rotor blades 108. The planet gear 132, or rather, the plurality of planet gears 132, are maintained stationary along the circumferential direction C through the mounting to the frame member 128. (Although not depicted, it will be appreciated that the frame member 128 may define a plurality of slots within which the planet gears 132 are positioned to allow the frame member 128 to extend through the gearbox 104.) In such a manner, it will be appreciated that the gearbox 104 facilitates a rotation of the low-speed LP compressor rotor blades 108 by the intermediate-speed spool 34, while reducing a rotational speed of the low-speed LP compressor rotor blades 108 relative to the intermediate-speed spool 34, and further reversing a rotational direction of the LP compressor 24 rotor blades relative to the intermediate-speed spool 34.

Further, it will be appreciated that for the embodiment shown the fan 40 of the fan section 14 is configured to be driven by both the low-speed spool 36 and the intermediate-speed spool 34, such that a driving power for the fan 40 is shared between these two spools 34, 36. More specifically, the low-speed spool 36, which is rotatable by the plurality of low-speed LP turbine rotor blades 68, is coupled to the fan 40 directly for driving the fan 40 at the same rotational speed and in the same rotational direction (e.g., without any gear reduction). Further, the plurality of low-speed LP compressor rotor blades 108 are also coupled to the fan 40 for adding power to the fan 40, such that the intermediate-speed spool 34 is also configured for driving the fan 40. However, the intermediate-speed spool 34 is coupled to the fan 40 across the gearbox 104 and the plurality of low-speed LP compressor rotor blades 108. More specifically, for the embodiment depicted, the intermediate-speed spool 34 is coupled to an aftmost stage of the low-speed LP compressor rotor blades 108A (across the sun gear, planet gears 132, and ring gear 134 of the gearbox 104 and the aft low-speed connection member 122), which is coupled to the outer drum 116, which is coupled to the forward low-speed connection member 120 (across a forwardmost stage of low-speed LP compressor rotor blades 108B), which is coupled to the fan 40.

In such a manner, it will be appreciated that the fan 40 is driven by both the intermediate-speed spool 34 and the low-speed spool 36 during operation. In such a manner, it will be appreciated that the gearbox 104 may not need to transfer all the power required for driving the fan 40 (as compared to traditional geared gas turbine engines). Such may result in less wear and tear on the gearbox 104, which may accordingly allow for a smaller, lighter, more compact, and less expensive gearbox 104. Further, utilizing an alternatingly spaced LP compressor 24 and/or an alternatingly spaced HP compressor 26 may allow for a much more efficient compressor section of the gas turbine engine, which may allow for a higher overall compressor ratio and/or a more compact compressor section. As such, the gas turbine engine may generally operate more efficiently.

Further, still, as the low speed spool 36 is providing a portion of the driving power for the fan 40 directly, and not through a gearbox, a portion of a forward thrust on the low speed spool 36 by the fan 40 may be offset by opposing axial forces on the low speed spool 36 by the LP turbine 30. Such may therefore allow for a lesser number of thrust bearings, or smaller thrust bearings, to be utilized to support the fan 40.

It will be appreciated, however, that in other exemplary embodiments, the turbofan engine 10 may have any other suitable configuration. For example, as will be noted flow, in other embodiments, the turbofan engine 10 may be configured as a direct drive gas turbine engine (i.e., may not include the gearbox 104), may include a single speed LP turbine, etc.

Figure 5:
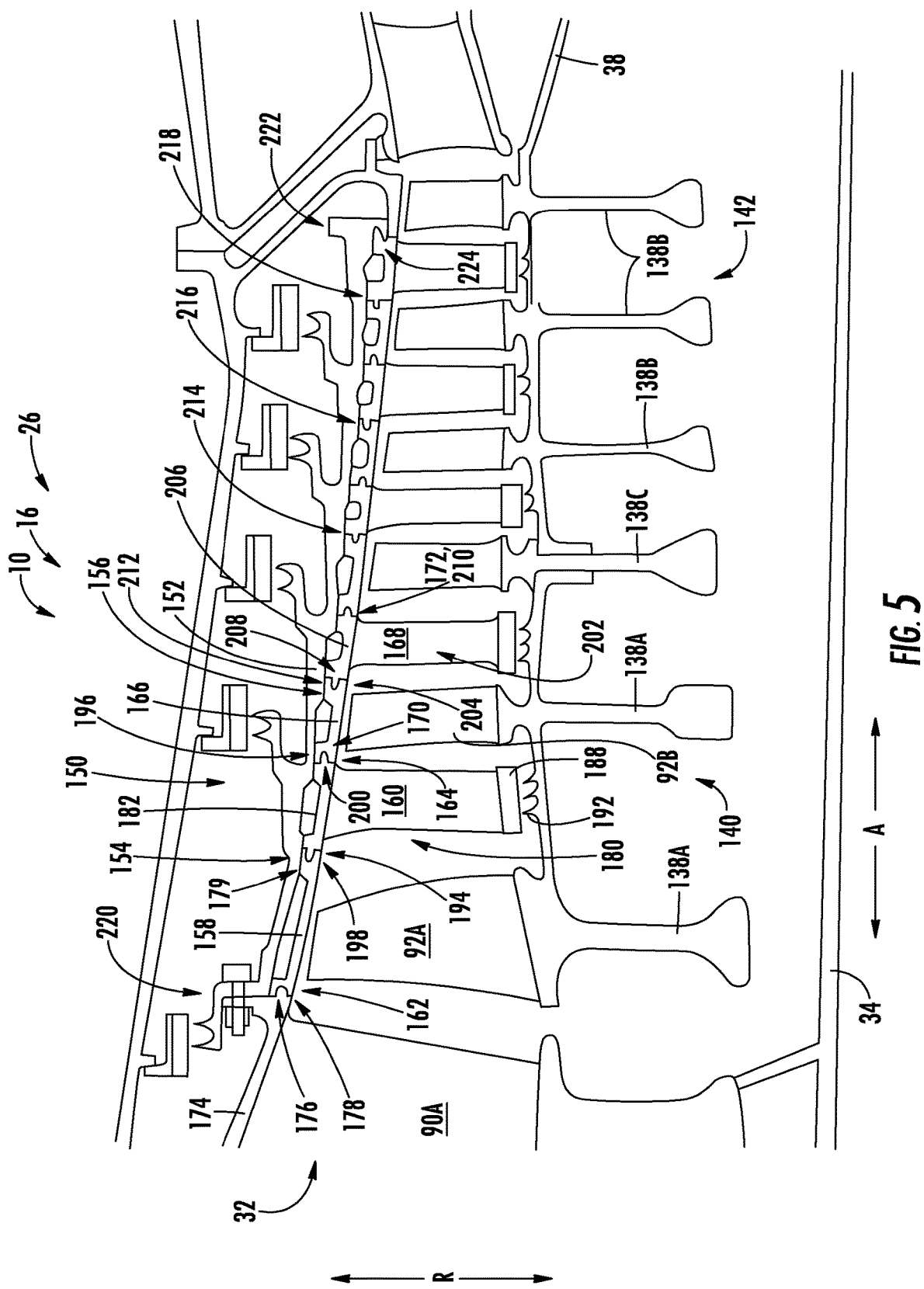
FIG. 5 is a close-up, schematic, cross sectional view of an HP compressor of the compressor section of the exemplary gas turbine engine of FIG. 1.

Referring now also to FIG. 5, aspects of the exemplary HP compressor 26 will now be described. As shown, the HP compressor 26 includes a plurality of first speed HP compressor rotor blades and a plurality of third speed HP compressor rotor blades. For the embodiment shown, the plurality of first speed HP compressor rotor blades is a plurality of intermediate-speed HP compressor rotor blades 90 and the plurality of third speed HP compressor rotor blades is a plurality of high-speed HP compressor rotor blades 92. The high-speed spool 38 is coupled to the plurality of high-speed HP compressor rotor blades 92 for driving/rotating the plurality of high-speed HP compressor rotor blades 92. Similarly, the intermediate-speed spool 34 is coupled to the plurality of intermediate-speed HP compressor rotor blades 90 for driving/rotating the plurality of intermediate-speed HP compressor rotor blades 90.

Similar to the LP compressor 24 and LP turbine 30, the plurality of high-speed HP compressor rotor blades 92 and the plurality of intermediate-speed HP compressor rotor blades 90 are alternatingly spaced along the axial direction A of the turbofan engine 10 and are configured to counter-rotate. For example, the plurality of high-speed HP compressor rotor blades 92 and the plurality of intermediate-speed HP compressor rotor blades 90 may be configured in a similar manner as the intermediate-speed and low-speed LP turbine rotor blades 66, 68 depicted in FIG. 3.

Further, for the embodiment shown, the HP compressor 26 includes a first HP compressor connection assembly 94 for coupling each of the plurality of high-speed HP compressor rotor blades 92 and a second HP compressor connection assembly 96 for coupling each of the plurality of intermediate-speed HP compressor rotor blades 90 of the HP compressor 26. The first HP compressor connection assembly 94 generally includes an inner drum 98, with each of the plurality of high-speed HP compressor rotor blades 92 coupled to the inner drum 98 at their respective radially inner ends. More specifically, as is depicted in FIG. 5, the inner drum 98 is actually a plurality of rotor disks 138, and more specifically still, the inner drum 98 is a forward section 140 of rotor disks 138A and an aft section 142 of rotor disks 138B, each coupled together at an intermediate rotor disk 138C.

As is also depicted in FIG. 5, the second HP compressor 26 connection assembly 96 is integrated with the plurality of intermediate speed HP compressor rotor blades 90. More specifically, the turbofan engine 10 includes a rotor blade assembly positioned in the compressor having a plurality of stage assemblies. More specifically, the turbofan engine 10 includes an intermediate speed HP compressor rotor blade assembly ("ISHP compressor rotor blade assembly") 150 positioned within the HP compressor 26 and including a plurality of intermediate speed HP stage assemblies ("ISHP stage assemblies"). The turbofan engine 10 additionally includes a drum member 152 positioned outward of the plurality of ISHP stage assemblies along the radial direction R and clamping the plurality of ISHP stage assemblies against one another, as will be explained further below.

For example, for the embodiment shown, the ISHP compressor rotor blade assembly 150 generally includes a first ISHP stage assembly 154 and a second ISHP stage assembly 156 pressed together by the rotating outer drum 152. (As will be appreciated, the designations "first," "second," etc. with respect to the ISHP stage assemblies do not necessarily imply the actual stage numbers, and instead are used to differentiate between the plurality of ISHP stage assemblies included.") More specifically, the first ISHP stage assembly 154 includes a first ring member 158 and a first stage of intermediate speed HP rotor blades 160 ("ISHP rotor blades," also referred to above generally using numeral 90). The first ring member 158 defines a first end 162 and the first stage of ISHP rotor blades 160 defines a second end 164. Similarly, the second ISHP stage assembly 156 includes a second ring member 166 and a second stage of ISHP rotor blades 168. The second ring member 166 defines a first end 170 and the second stage of ISHP rotor blades 168 defines a second end 172. The second end 164 of the first stage of ISHP rotor blades 160 and the first end 170 of the second ring member 166 together form an attachment interface, which as is explained below is a third attachment interface 200. The drum member 152 clamps the first ISHP stage assembly 154 against the second ISHP stage assembly 156 to mount the first and second ISHP stage assemblies 154, 156 within the HP compressor 26 of the turbomachine of the turbofan engine 10, fixing the third attachment interface 200, again as will be explained in greater detail, below.

Figure 6:
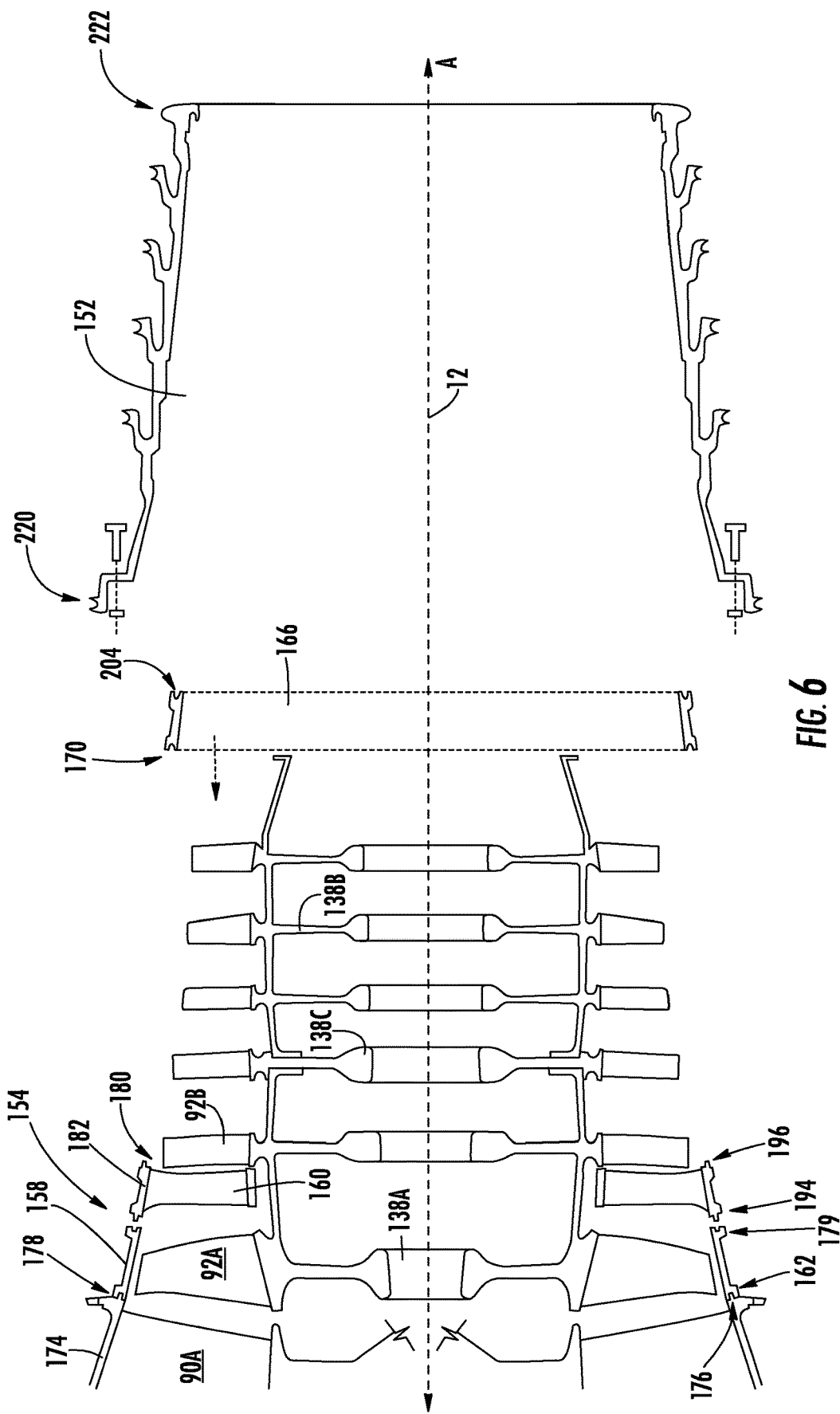
FIG. 6 is an exploded view of certain components of the HP compressor of FIG. 5.

Referring now also to FIG. 6, the ISHP compressor rotor blade assembly 150 of FIG. 5, and the installation/assembly of the ISHP compressor rotor blade assembly 150 in the HP compressor 26, will be described in more detail. FIG. 6 provides a partial, exploded view of the ISHP compressor rotor blade assembly 150 of FIG. 5.

For the embodiment of FIGS. 5 and 6, the exemplary ISHP compressor rotor blade assembly 150 may be installed subsequent to the plurality of high-speed HP compressor rotor blades 92. For example, as is depicted in FIG. 6, the plurality of high-speed HP compressor rotor blades 92 may be fixed to the respective plurality of rotor disks 138, and more specifically, for the embodiment shown, the forward section 140 of rotor disks 138A and aft section 142 of rotor disks 138B may be coupled together and to the intermediate rotor disk 138C, prior to installing the stage assemblies of the exemplary ISHP rotor blade assembly 150 depicted. Notably, however, the forward-most intermediate speed HP compressor rotor blades 90A may be installed prior to the ISHP rotor blade assembly 150, and optionally prior to the plurality of high-speed HP compressor rotor blades 92. Briefly, it will be appreciated that the forward-most stage of intermediate speed HP compressor rotor blades 90A generally includes an outer platform 174 having an aft end 176.

Subsequent to installing the plurality of high-speed HP compressor rotor blades 92 (or at least the forward section 140, as will be explained below) and the forward-most stage of intermediate speed HP compressor rotor blades 90A, the first stage assembly 154 may be installed. More specifically, as will be appreciated the first ring member 158 and the first stage of ISHP rotor blades 160 of the first ISHP stage assembly 154 are separate components, installed separately and sequentially for the embodiment depicted. As such, at a first installation step, the first ring member 158 of the first ISHP stage assembly 154, and more specifically, the first end 162 of the first ring member 158 of the first ISHP stage assembly 154, may be fitted against the aft end 176 of the outer platform 174 of the forward-most stage of intermediate speed HP compressor rotor blades 90A, forming a first attachment interface 178. The first ring member 158 is depicted in FIG. 6 having been fitted against the outer platform 174.

In at least certain exemplary embodiments of the present disclosure, the first ring member 158 is configured as a complete 360 degree ring member (i.e., extending continuously along the circumferential direction C to form a complete circle; similar to the second ring member 166, shown in FIG. 6 and discussed below). As such, it will be appreciated that the first ring member 158 defines a span (i.e., a angular span) along the circumferential direction C, which may be 360 degrees. The first ring member 158 may therefore be installed by sliding it generally along the axial direction A, over the plurality of high-speed HP compressor rotor blades 92 into position, as shown. Briefly, however, in alternative embodiments the first ring member 158 may be formed of two or more separate first ring members 158 that together extend 360 degrees in the circumferential direction C about the longitudinal axis 12. With such a configuration, it will be appreciated that the first ring member 158, or rather each of the separate first ring members 158, may individually define a span along the circumferential direction C less than 360 degrees, such as, e.g., 180 degrees.

Once the first ring member is installed, the first stage of ISHP rotor blades 160 may be installed. Referring still to FIGS. 5 and 6, it will further be appreciated that for the embodiment shown, the first ring member 158 further defines a second end 179, with the first ring member 158 extending generally along the axial direction A between the first end 162 and the second end 180. Further, the first stage of ISHP rotor blades 160 of the first stage assembly 154 is formed of a plurality of segments 180, each segment 180 including one or more of the first stage ISHP rotor blades 160. For example, referring briefly to FIG. 7, a segment 180 of first stage ISHP rotor blades 160 is depicted. It will be appreciated that each segment 180 of first stage ISHP rotor blades 160 includes at least two ISHP rotor blades 160 and up to, e.g., fifteen ISHP rotor blades 160 in the embodiment depicted. Specifically, for the embodiment shown, the segment 180 of first stage ISHP rotor blades 160 includes three first stage ISHP rotor blades 160. Each of the first stage ISHP rotor blades 160 are spaced generally along the circumferential direction C, and each is coupled to an outer platform 182 at their respective radially outer ends 184. As will be appreciated, the outer platform 182 of each segment 180 of first stage ISHP rotor blades 160 defines a span 186 (i.e., an angular span) along the circumferential direction C. The span 186 of the outer platform 182 of each segment 180 of first stage ISHP rotor blades 160 may be less than the span of the first ring member 158 of the first ISHP stage assembly 154. For example, for the embodiment shown, the span 186 of the outer platform 182 of the segment 180 of first stage ISHP rotor blades 160 may be between about five degrees and about ninety degrees, such as between about ten degrees and about forty-five degrees. Accordingly, the first stage of ISHP rotor blades 160 may be formed of between about twenty segments 180 of first stage ISHP rotor blades 160 and about four segments 180 of first stage ISHP rotor blades 160, arranged sequentially along the circumferential direction C.

Briefly, it will further be appreciated that the segment 180 depicted (and more specifically, each of the segments 180) further includes a seal land 188, with each of the plurality of first stage ISHP rotor blades 160 coupled to the seal land 188 at their respective radially inner ends 190. The seal lands 188 are configured to form an airflow seal with a respective plurality of seal teeth 192 positioned between adjacent rotor disks 138 of the HP compressor 26, and more specifically, of the high-speed components of the HP compressor 26 (see, e.g., FIG. 5).

Referring now back particularly to FIGS. 5 and 6, as noted, the first stage of ISHP rotor blades 160, or rather the segments 180 of first stage of ISHP rotor blades 160 may be installed after the first ring member 158 is in position. As such, it will be appreciated that the outer platform 182 of each segment 180 of first stage ISHP rotor blades 160 extends between a first end 194 and a second end 196 generally along the axial direction A. For the embodiment shown, the first end 194 is generally a forward end and the second end 196 is generally an aft end. The second end 164 of the first ISHP stage assembly 154 is formed of the second ends 196 of the outer platforms 182 of the plurality of segments 180.

Further, the first end 194 of the outer platform 182 of each segment 180 of first stage ISHP rotor blades 160 may be fitted against the second end of the first ring member 158 to form a second attachment interface 198 with the first ring member 158, which is an inter-stage attachment interface. In such a manner, an entirety of the first stage of ISHP rotor blades 160 may be installed in the HP compressor 26, sequentially, one segment 180 at a time, at a location between the immediately forward and aft stages of assembled high speed HP compressor rotor blades 92. Further, as will be appreciated, in such a manner, the entirety of the first stage of ISHP rotor blades 160 may have a substantially symmetrical shape along the circumferential direction C.

Referring still to FIGS. 5 and 6, as noted above, the second ISHP stage assembly 156 may be fitted against the first ISHP stage assembly 154 at a third attachment interface 200. More specifically, it will be appreciated that the second ISHP stage assembly 156 is similarly formed of the second ring member 166 and the separate, second stage of ISHP rotor blades 168. The second stage of ISHP rotor blades 168 may also be formed of a plurality of segments 202.

Figure 7:
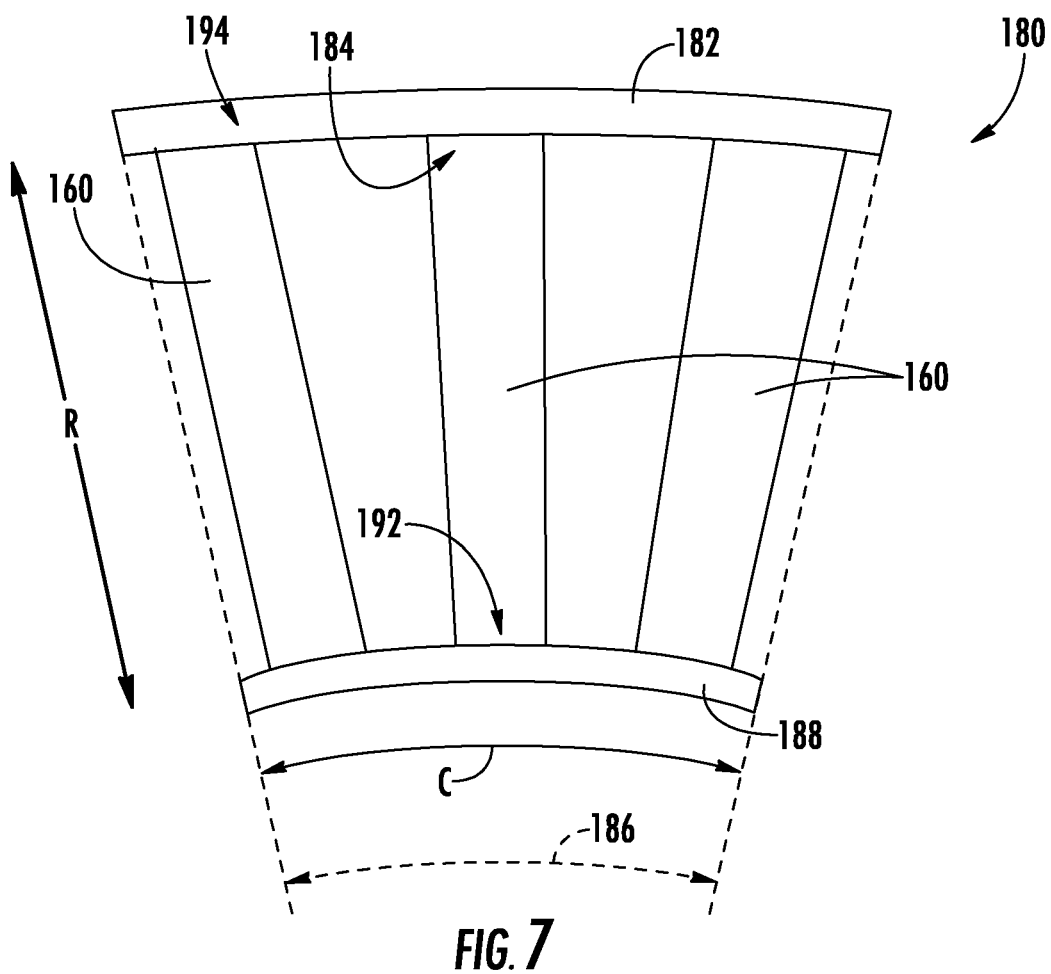
FIG. 7 is a forward looking aft view of a segment of rotor blades in accordance with an exemplary embodiment of the present disclosure.

In at least certain exemplary embodiments, the second ring member 182 may be configured similarly to the first ring member 158, and the segments 202 of second stage ISHP rotor blades 168 may be configured similarly to the segments 180 of first stage ISHP rotor blades 160 (see, e.g., FIG. 7). Accordingly during installation of the second stage assembly 154, the second ring member 166 may be installed prior to the second stage of ISHP rotor blades 168, and subsequent to the first ISHP stage assembly 154. More particularly, as is depicted most clearly in FIG. 6, the second ring member 166 may be moved generally along the axial direction A, over the assembled high speed HP compressor rotor blades 92, and fitted against the second end 164 of the first ISHP stage assembly 154, such that the first end 170 of the second ring member 166 is fitted against the second end 154 of the first ISHP stage assembly 154, forming the third attachment interface 200. The first end 170 of the second ring member 166 and second end 154 of the first ISHP stage assembly 154 accordingly form the third attachment interface 200.

After installation of the second ring member 166, the second stage ISHP rotor blades may be installed. For the embodiment shown, it will be appreciated that the second ring member 166 additionally defines a second end 204, and extends between the first end 170 and second end 204 generally along the axial direction A. Each segment 202 of second stage ISHP rotor blades 168 of the second stage of ISHP rotor blades 168 includes an outer platform 206 also extending between a first end 208 and a second end 210 generally along the axial direction A. The second ends 210 of the outer platforms 206 of the plurality of segments 180 of the second stage ISHP rotor blades 168 may together form the second end 172 of the second ISHP stage assembly 156.

The plurality of segments 180 of second stage ISHP rotor blades 168 are installed, e.g., sequentially, by fitting the first end 208 of the outer platform 206 of each segment 202 of second stage ISHP rotor blades 168 to the second end 204 of the second ring member 166. The first end 208 of the outer platform 206 of each segment 202 of second stage ISHP rotor blades 168 together form a fourth attachment interface 212 with the second end 204 of the second ring member 166 (FIG. 5).

Further, it will be appreciated that the ISHP compressor rotor blade assembly 150 further includes a third ISHP stage assembly 214, a fourth ISHP stage assembly 216, and a fifth ISHP stage assembly 218. The third ISHP stage assembly 214, fourth ISHP stage assembly 216, and fifth ISHP stage assembly 218 may each be configured in substantially the same manner as the first and second ISHP stage assemblies 154, 156, and further may be installed sequentially subsequent to the installation of the second ISHP stage assembly 156, and in substantially the same manner as the first and second ISHP stage assemblies 154, 156.

As noted above, the HP compressor 26 further includes the plurality of high-speed rotor blades. For example, the plurality of high-speed HP compressor rotor blades 92 includes a first stage of high-speed HP compressor rotor blades 92A and a second stage of high-speed HP compressor rotor blades 92B. The first stage of high-speed HP compressor rotor blades 92A is positioned forward of the first stage ISHP rotor blades 160 of the first ISHP stage assembly 154, and aft of the forward-most intermediate-speed HP compressor rotor blades 90A. Additionally, the second stage of high-speed HP compressor rotor blades 92B is positioned forward of the second stage of ISHP rotor blades 168 of the second ISHP stage assembly 156, and aft of the first stage of ISHP rotor blades 160 of the first ISHP stage assembly 154. Further, as is depicted, the first ring member 158 of the first ISHP stage assembly 154 is positioned outward of the first stage of high-speed HP compressor rotor blades 92A along the radial direction R and the second ring member 166 is positioned outward of the second stage of high-speed HP compressor rotor blades 92B along the radial direction R. In such a manner, it will be appreciated that the first ring member 158 surrounds the first stage of high-speed HP compressor rotor blades 92A along the circumferential direction C and the second ring member 166 surrounds the second stage of high-speed HP compressor rotor blades 92B along the circumferential direction C.

It will further be appreciated that the ring members of the remaining ISHP stage assemblies 214, 216, 218 similarly are positioned outward of respective stages of high-speed HP compressor rotor blades 92, and surrounding such respective stages of high-speed HP compressor rotor blades 92.

Figure 8:
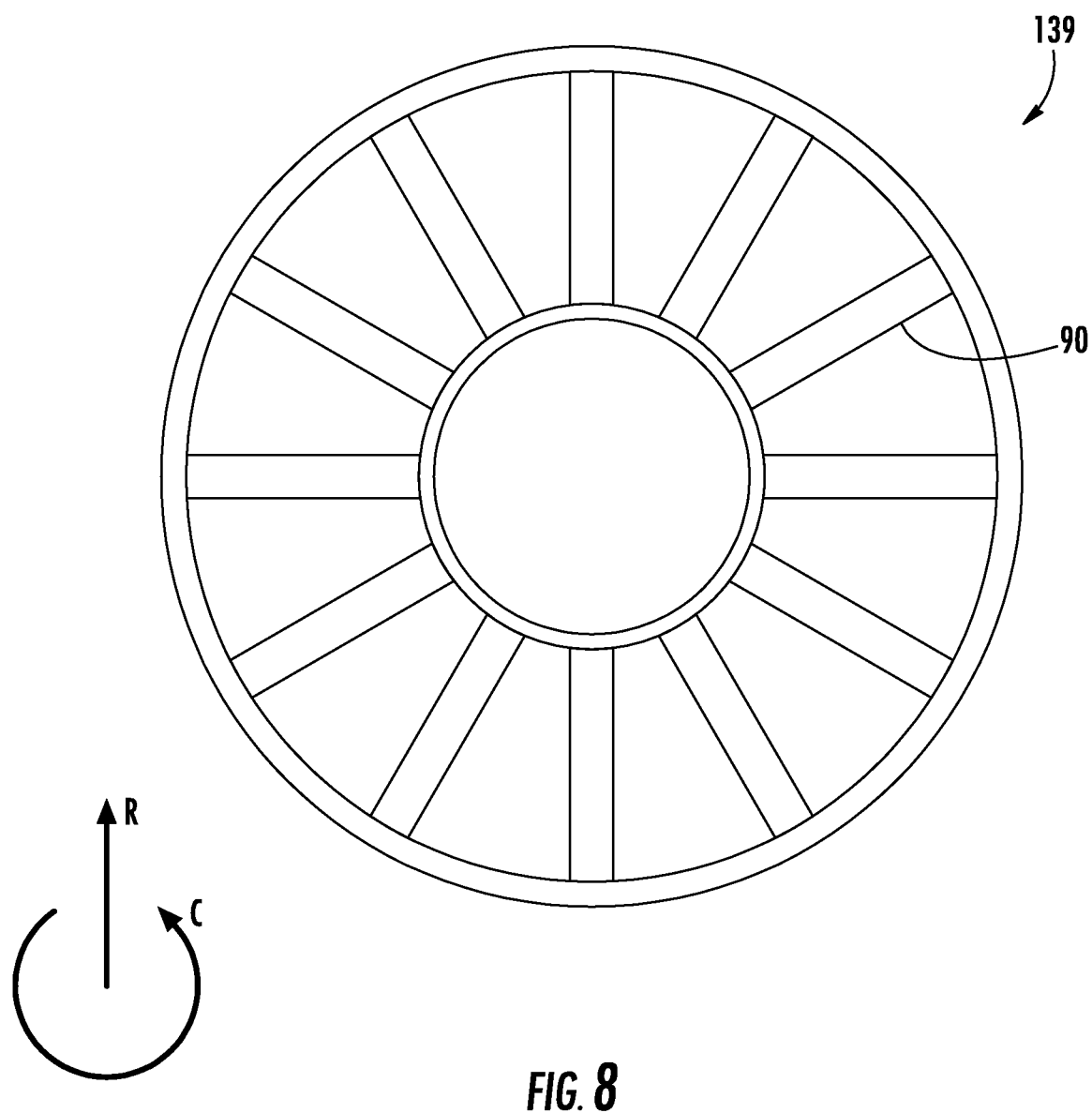
FIG. 8 is a forward looking aft view of a blisk in accordance with an embodiment of the present disclosure.

Briefly, it will further be appreciated that for the embodiment shown, the high-speed HP compressor rotor blades 92 are coupled to a forward section 140 of rotor disks 138A, an intermediate rotor disk 138C, and an aft section 142 of rotor disks 138B. As such, one or more of the stages of ISHP rotor blades of the rotor assembly 150 may be configured as a blisk (i.e., a bladed disk) or some other pre-assembled, three hundred and sixty degree structure including the respective ISHP rotor blades. For example, referring briefly to FIG. 8, a view of a blisk 139 in accordance with the present disclosure is depicted schematically. In certain exemplary embodiments, the second stage of ISHP rotor blades of the second stage assembly 156 may be configured as the blisk 139 and installed prior to the intermediate rotor disk 138C and corresponding high speed HP compressor rotor blades 92, and further prior to the aft section 142 of rotor disks 138B and corresponding high speed HP compressor rotor blades 92. The remaining stages of ISHP rotor blades, however, may be configured in the manner discussed above and installed subsequent to the installation of the intermediate rotor disk 138C and corresponding high speed HP compressor rotor blades 92, and further subsequent to the aft section 142 of rotor disks 138B and corresponding high speed HP compressor rotor blades 92. Notably, although not depicted, in other embodiments, it will further be appreciated that the ISHP compressor rotor blade assembly 150 may further include a stage of ISHP rotor blades bolted, or otherwise attached, to an aft end of the drum member 152. Such a stage of ISHP rotor blades may also be configured as the blisk 139 or some other pre-assembled, three hundred and sixty degree structure including the respective ISHP rotor blades.

Referring still to the embodiment depicted in FIGS. 5 and 6, subsequent to the installation of the various ISHP stage assemblies of the ISHP compressor rotor blade assembly 150, the drum member 152 may be installed. As depicted in FIGS. 5 and 6, the drum member 152 extends generally along the axial direction A between a first, forward end 220 and a second, aft end 222. The second end 222 of the drum member 152 is configured to attach to the last-installed ISHP stage assembly of the ISHP compressor rotor blade assembly 150. Accordingly, for the embodiment shown, the drum member 152 is configured to attach to the fifth ISHP stage assembly 218, and more specifically, to a second end 224 of the fifth ISHP stage assembly 218. More particularly, referring briefly to FIG. 9, providing a close of view of the second end 224 of the fifth ISHP stage assembly 218, it will be appreciated that the second end 224 of the fifth ISHP stage assembly 218 defines a circumferential groove 226, and the second end 222 of the drum member 152 defines a hook 228 configured to fit into the circumferential groove 226 at the second end 224 of fifth ISHP stage assembly 218. Notably, the second end 224 may be a plurality of second ends of a respective plurality of outer platforms of a respective plurality of segments of the fifth ISHP stage assembly 218.

Figure 9:
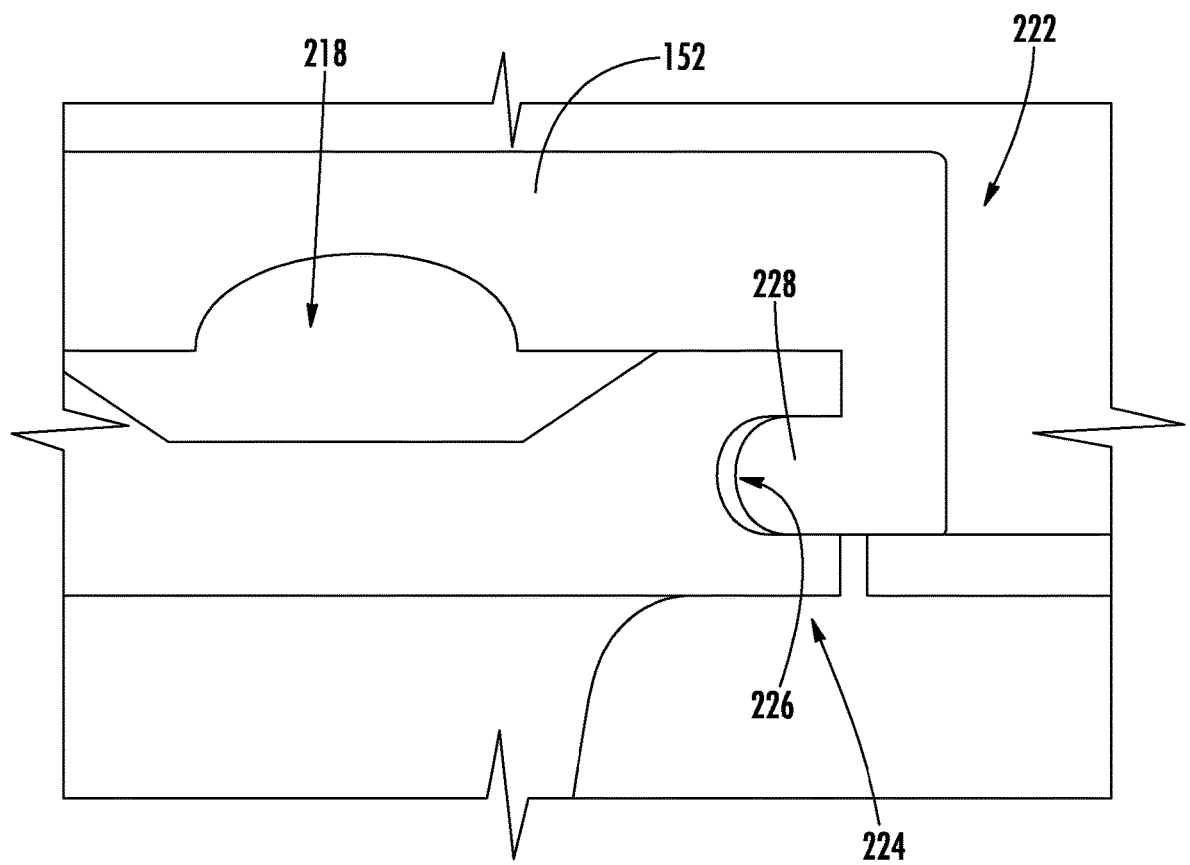
FIG. 9 is a close-up schematic view of an aft end of a rotating drum in accordance with an exemplary aspect of the present disclosure.

Further, referring now back to FIGS. 5 and 6, the drum member 152 may be installed by sliding it generally along the axial direction A, such that the second end 222 couples to the last, aft-most ISHP stage assembly (which for the embodiment depicted is the fifth ISHP stage assembly 218, and more particularly such that the hook 228 is positioned in the circumferential groove 226 (FIG. 9). As is also depicted, the forward-most stage of intermediate speed HP compressor rotor blades 90A, or rather, the outer platform 174 of the forward-most stage of intermediate speed HP compressor rotor blades 90A, includes a flange 230 extending along the circumferential direction C, and the forward end 220 of the drum member 152 similarly includes flange 232 extending along the circumferential direction C. When installed, the flange 230 may be coupled to the flange 232 (e.g., through a bolted attachment), such that the drum member 152 accordingly clamps each of the plurality of rotor blade assemblies of the rotor assembly 150 towards one another. In such a manner, the drum member 152 may ensure that each of the respective attachment interfaces fix the ISHP stage assemblies in position.

More specifically, each of the attachment interfaces between adjacent ISHP stage assemblies, and within each ISHP stage assembly, are friction fit interfaces. For example, referring briefly specifically to FIG. 10, a close-up view is provided of the second attachment interface 198. The second attachment interface 198 is configured as a tongue and groove attachment interface. More specifically, the first end 194 of the outer platform 182 of the segment 180 of the first stage ISHP rotor blades 160 includes a ridge 234 extending forward along the axial direction A, and circumferentially. Similarly, the second end 179 of the first ring member 158 includes a groove 236 extending along the circumferential direction C and correspondingly shaped to the ridge 234 of the outer platform 182 of the segment 180 of the first stage ISHP rotor blades 160. The ridge 234 is positioned within the groove 236 to form the second attachment interface 198.

Figure 10:
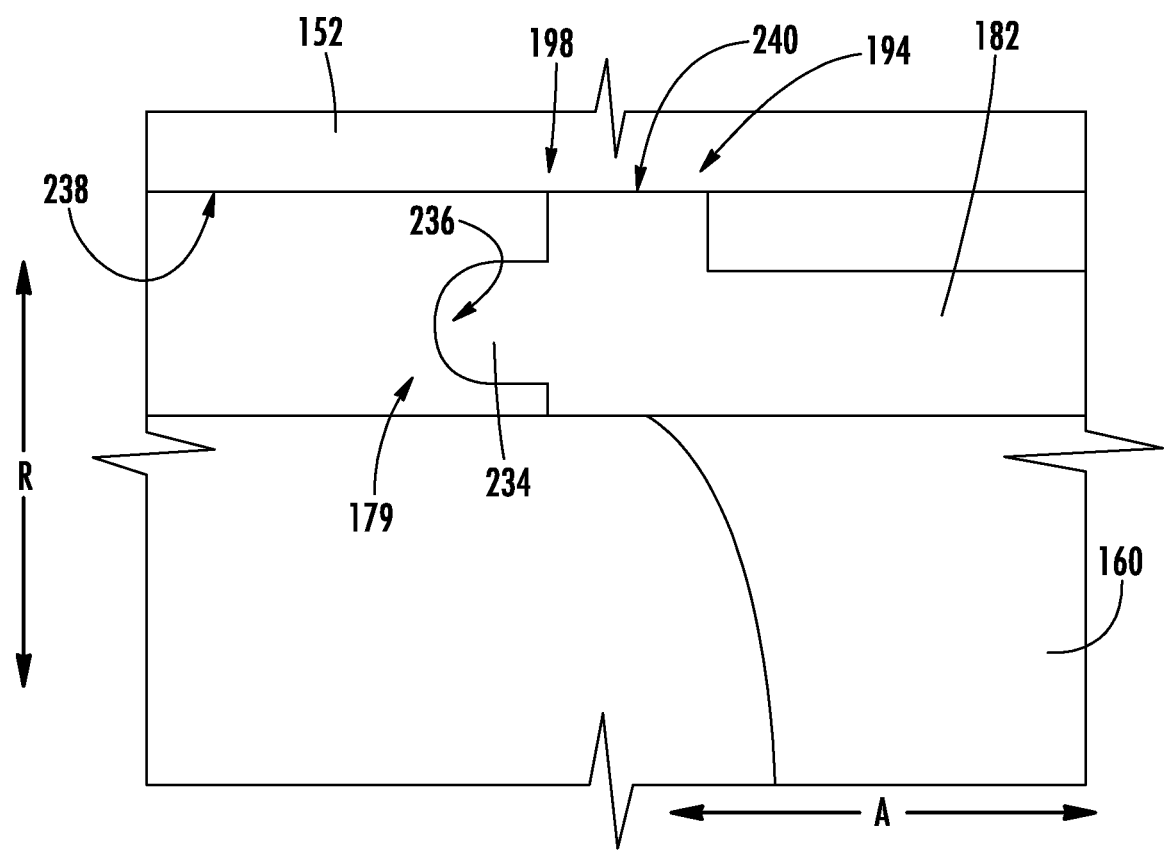
FIG. 10 is a close-up schematic view of an attachment interface in accordance with an exemplary aspect of the present disclosure.

Moreover, referring back to FIGS. 5 and 6, each of the other attachment interfaces are configured in a similar manner to the second attachment interface 198 depicted in FIG. 10. As such, when the components are pressed against one another by the drum member 152, the pressing force and friction between the two components fix the components in position without the need of, e.g., bolted connections.

It will be appreciated, however, that in other exemplary embodiments, one or more of the attachment interfaces may instead be any other suitable form of attachment interface, such as any other suitable friction fit attachment interface. For example, in other embodiments, one or more of the attachment interfaces may be a lap joint, or other suitable friction fit joint defining corresponding structure to fix the components in place once installed. Further, in other exemplary embodiments, one or more of the attachment interfaces may include a circumferential retainment feature for preventing a circumferential migration of, e.g., blade segments (such as, for example, segments 180) within the assembly 150 while operating under vibratory or torsional loads. The circumferential retainment feature may be, e.g., a pin extending through the adjacent components, corresponding keys or notches, etc.

Further, referring still to FIG. 10 (and FIG. 5) it will also be appreciated that the drum member 152 defines an inner surface 238. The inner surface 238 contacts an outer surface 240 of each of the plurality of ISHP stage assemblies, and more specifically, each of the respective ring members and outer platforms of the ISHP stage assemblies, to further maintain the ISHP stage assemblies in position during operation of the compressor. For example, in the embodiment of FIG. 10, the inner surface 238 contacts the first ISHP stage assembly 154 at the second attachment interface 198 to further support the first ISHP stage assembly 154 and constrain the first ISHP stage assembly 154 along the radial direction R.

The exemplary ISHP compressor rotor blade assembly 150 depicted in FIGS. 5 through 9 and described above generally allows for the installation of a plurality of rotor blades of a counterrotating compressor or turbine subsequent to full assembly (or partial assembly in certain situations, as discussed above) of the other speed rotor blades of the counterrotating compressor or turbine. Accordingly, it will be appreciated that although described above with regard to the assembly of a plurality of compressor rotor blades, in other embodiments, the same or similar structure and process may be used to assembly a plurality of turbine rotor blades. It will be appreciated, however, that in such an exemplary embodiment, the assembly procedure may go from an aft end towards a forward end (as opposed to the forward-to-aft assembly shown in the embodiment shown in FIGS. 5 through 9). Such may be due to the slope of the outer wall of the turbine as compared to the slope of the outer wall of the compressor.

Regardless, in at least certain exemplary embodiments of the present disclosure, the exemplary ISHP compressor rotor blade assembly 150 (or other similar turbine rotor blade assembly) may be assembled such that there are no flanges or other similar members coupling, e.g., a top half and a bottom half, resulting in a substantially completely symmetrical rotor blade assembly (e.g., compressor rotor blade assembly 150) capable of being installed within an already installed set of stages of rotor blades. The symmetrical configuration may result in a more desired operation of the compressor or turbine, more capable of accommodating, e.g., thermal expansion during operation.

Generally, it will be appreciated however that the exemplary turbofan engine 10 described above with reference to FIGS. 1 through 9 is provided by way of example only. In other exemplary embodiments, any other gas turbine engine configuration may be provided. For example, in certain exemplary embodiments, one or more of the LP compressor 24, HP turbine 28, or LP turbine 30 may include a mounting configuration similar to the ISHP compressor rotor blade assembly 150 described above with reference to FIGS. 5 through 9. Additionally, or alternatively, although the LP compressor 24, HP compressor 26 and LP turbine 30 are depicted as including counterrotating rotor blades, in other embodiments, other suitable compressors and/or turbines may be provided (e.g., the LP or HP compressor 24, 26 may be setup as a separate intermediate pressure compressor and low or high pressure compressor; similarly the LP turbine 30 may be setup as a separate intermediate pressure turbine and low pressure turbine). Similarly, although the HP turbine 28 is depicted as a single stage HP turbine 28, in other embodiments, the HP turbine 28 may include any other suitable number of stages, may also be a counterrotating HP turbine 28, etc. Further, still, in other embodiments, the turbofan engine 10 may include any other suitable number or arrangement of compressors, turbines, etc.

It will further be appreciated that although the turbofan engine 10 is depicted as a ducted turbofan engine 10, in other exemplary embodiments, aspects the present disclosure may be incorporated into any other suitable turbomachine 16 and gas turbine engine, such as an un-ducted turbofan engine 10, a turboprop engine, a turbojet engine, a turboshaft engine, etc. Further, still, although depicted as an aeronautical gas turbine engine, in other exemplary embodiments, aspects of the present disclosure may be incorporated into any other suitable gas turbine engine, such as an aeroderivative gas turbine engine (e.g., a nautical gas turbine engine), an industrial gas turbine engine, etc.

Moreover, it will be appreciated that in still other exemplary embodiments of the present disclosure, the turbofan engine 10 may not include each of the features described herein, and/or alternatively, may include additional features not described herein.

Figure 11:
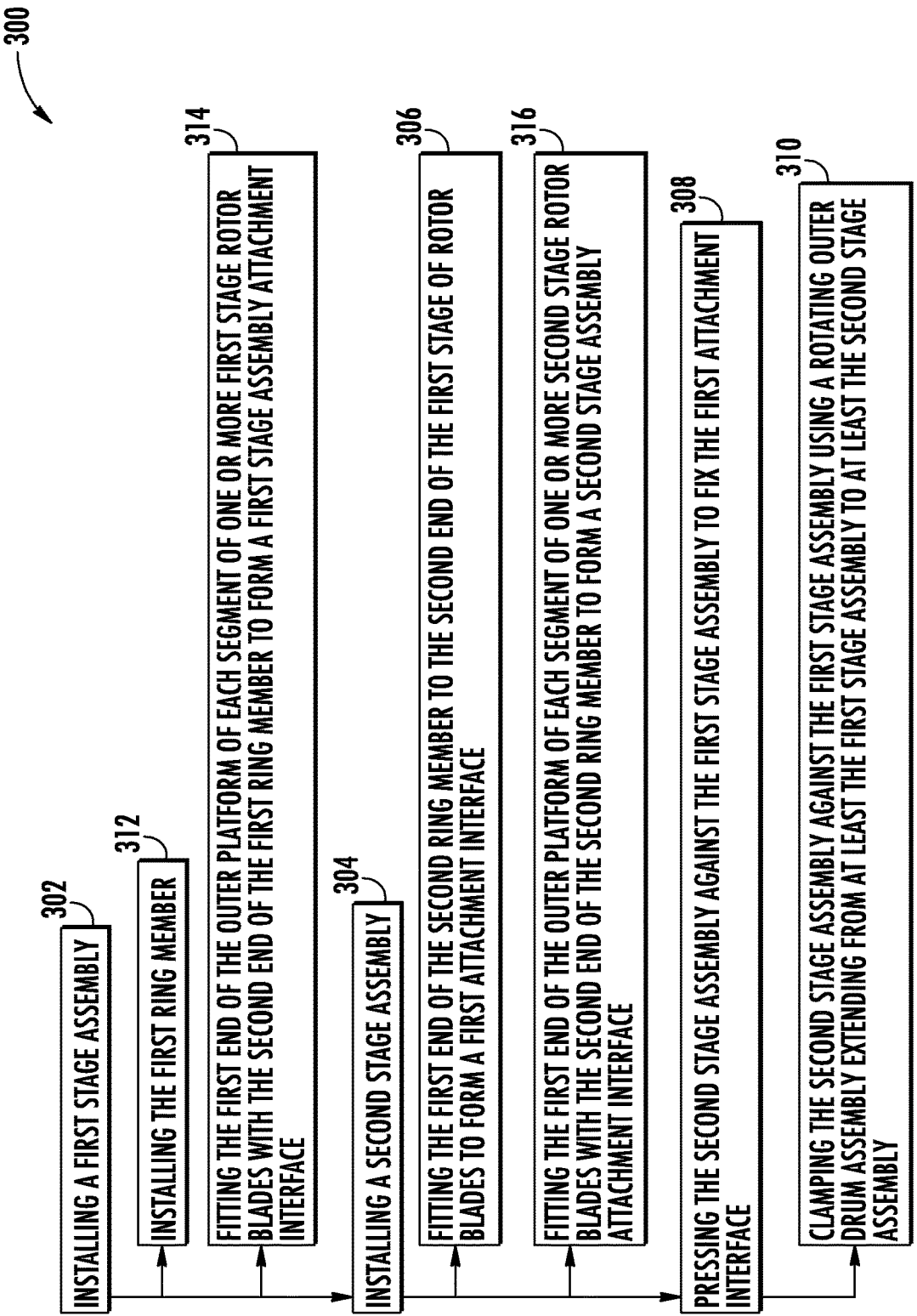
FIG. 11 is a flow diagram of a method of assembling a compressor or a turbine of a gas turbine engine in accordance with an aspect of the present disclosure.

Referring now to FIG. 11, a flow diagram of a method 300 of assembling a compressor or a turbine of the gas turbine engine defining an axial direction, a radial direction, and a circumferential direction is provided. The method 300 may be utilized with one or more of the exemplary gas turbine engine aspects described above with reference to FIGS. 1 through 9. However, in other embodiments, the method 300 may be utilized with any other suitable gas turbine engine.

The method 300 generally includes at (302) installing a first stage assembly. The first stage assembly includes a first ring member and a first stage of rotor blades. The first ring member defines a first end and the first stage of rotor blades defines a second end. The method 300 further includes at (304) installing a second stage assembly. The second stage assembly similarly includes a second ring member and a second stage of rotor blades. The second ring member defines a first end and the second stage of rotor blades defines a second end. It will be appreciated that for the exemplary aspect depicted, installing the second stage assembly at (304) includes at (306) fitting the first end of the second ring member to the second end of the first stage of rotor blades to form a first attachment interface. Moreover, the method 300 includes at (308) pressing the second stage assembly against the first stage assembly to fix the first attachment interface. More specifically, for the exemplary aspect depicted, pressing the second stage assembly against the first stage assembly at (308) includes at (310) clamping the second stage assembly against the first stage assembly using a rotating outer drum assembly extending from at least the first stage assembly to at least the second stage assembly. However, in other exemplary aspects, the second stage assembly may be pressed against the first stage assembly using, e.g., a bolted connection at respective flanges, etc.

In such a manner, it will be appreciated that the first stage assembly and the second stage assembly may be installed within a counterrotating compressor or turbine having a first set of rotor blades already in position.

More specifically, referring still to FIG. 11, it will be appreciated that for the exemplary aspect depicted, the first stage assembly and second stage assembly are each configured as a plurality separate components that may be installed in a particular order or manner to facilitate their installation into a set of rotor blades already in position.

For example, it will be appreciated that the first ring member and first stage of rotor blades of the first stage assembly are separate components, and that the first ring member further defines a second end. Additionally, the first stage of rotor blades includes a plurality of segments of one or more first stage rotor blades, with each segment of one or more first stage rotor blades including an outer platform extending between a first end and a second end generally along the axial direction. With such an exemplary aspect, such as the aspect depicted, installing the first stage assembly at (302) further includes at (312) installing the first ring member, and at (314) fitting the first end of the outer platform of each segment of one or more first stage rotor blades with the second end of the first ring member to form a first stage assembly attachment interface. Further, in certain exemplary aspects fitting the first end of the outer platform of each segment of one or more first stage rotor blades with the second end of the first ring member at (314) may include fitting a first end of an outer platform of a plurality of segments of one or more first stage rotor blades with the second end of the first ring member to form a complete stage of rotor blades.

Moreover, it will similarly be appreciated that the second ring member and second stage of rotor blades of the second stage assembly are also separate components. As such, it will be appreciated that the second ring member further defines a second end, and further that the second stage of rotor blades includes a plurality of segments of one or more second stage rotor blades, with each segment of one or more second stage rotor blades including an outer platform extending between a first end and a second end generally along the axial direction. With such an exemplary aspect, such as the aspect depicted, installing the second stage assembly at (304) further includes at (316) fitting the first end of the outer platform of each segment of one or more second stage rotor blades with the second end of the second ring member to form a second stage assembly attachment interface. Further, in certain exemplary aspects fitting the first end of the outer platform of each segment of one or more second stage rotor blades with the second end of the second ring member at (316) may include fitting a first end of an outer platform of a plurality of segments of one or more second stage rotor blades with the second end of the second ring member to form another complete stage of rotor blades.

Notably, it will be appreciated that with such an exemplary aspect, setting the first end of the second ring member to the second end of the first stage of rotor blades at (306) may occur subsequent to fitting the first end of the outer platform of each segment of one or more first stage rotor blades with the second end of the first ring member at (314) and prior to fitting the first end of the outer platform of each segment of one or more second stage rotor blades with the second end of the second ring member at (316). Further, it will be appreciated that with such an exemplary aspect pressing the second stage assembly against the first stage assembly at (308) may occur subsequent to fitting the first end of the outer platform of each segment of one or more second stage rotor blades with the second end of the second ring member at (316). Moreover, although not depicted, in further aspects of the present disclosure, the method 300 may further include installing a third stage assembly, a fourth stage assembly, etc. Installing these additional stage assemblies may additionally occur prior to pressing the second stage assembly against the first edge assembly at (308).

In such a manner, it will be appreciated that the first stage assembly and the second stage assembly may be installed within a counterrotating compressor or turbine having a first set of rotor blades already in position, while maintaining a substantially symmetrical shape for the rotor assembly including the first stage assembly, the second stage assembly, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Further, components described herein and shown in the Figures are of one embodiment, and in other embodiments may be included with other suitable component. As such, it should be appreciated that no group of components described herein and depicted in the Figures is inextricably linked unless expressly disclosed as such.

What is claimed is:

1. A method of assembling a compressor or a turbine of a gas turbine engine defining an axial direction, a radial direction, and a circumferential direction, the method comprising:

installing a first stage assembly comprising a first ring member and a first stage of rotor blades, the first ring member defining a first end and the first stage of rotor blades defining a second end;

installing a second stage assembly comprising a second ring member and a second stage of rotor blades, the second ring member defining a first end and the second stage of rotor blades defining a second end, wherein installing the second stage assembly comprises fitting the first end of the second ring member to the second end of the first stage of rotor blades to form a first attachment interface; and pressing the second stage assembly against the first stage assembly to fix the first attachment interface.

2. The method of claim 1, wherein pressing the second stage assembly against the first stage assembly comprises clamping the second stage assembly against the first stage assembly using a rotating outer drum assembly extending from at least the first stage assembly to at least the second stage assembly.

3. The method of claim 1, wherein the first ring member further defines a second end, wherein the first stage of rotor blades comprises a plurality of segments of one or more first stage rotor blades, wherein each segment of one or more first stage rotor blades comprises an outer platform extending between a first end and a second end generally along the axial direction, and wherein installing the first stage assembly comprises fitting the first end of the outer platform of each segment of one or more first stage rotor blades with the second end of the first ring member to form a stage assembly attachment interface.

4. The method of claim 3, wherein the first ring member defines a first span along the circumferential direction, wherein the outer platform of each segment of one or more first stage rotor blades defines a second span along the circumferential direction, and wherein the first span is greater than the second span.

5. The method of claim 3, wherein the segment of one or more first stage rotor blades is a segment of at least two rotor blades and up to fifteen rotor blades.

6. The method of claim 3, wherein fitting the first end of the outer platform of each segment of one or more first stage rotor blades with the second end of the first ring member comprises installing the plurality of segments of one or more first stage rotor blades sequentially.

7. The method of claim 3, wherein the second ring member further defines a second end, wherein the second stage of rotor blades comprises a plurality of segments of one or more second stage rotor blades, wherein each segment of one or more second stage rotor blades comprises an outer platform extending between a first end and a second end generally along the axial direction, and wherein installing the second stage assembly comprises fitting the first end of the outer platform of each segment of one or more second stage rotor blades with the second end of the second ring member to form a second stage assembly attachment interface.

8. The method of claim 1, wherein the attachment interface is configured as a tongue and groove attachment interface.

9. The method of claim 1, wherein the first stage of rotor blades is a first stage of first speed rotor blades, wherein the second stage of rotor blades is a second stage of first speed rotor blades, wherein the gas turbine engine further comprises a first stage of second speed rotor blades and a second stage of second speed rotor blades, wherein the first ring member is positioned outward of the first stage of second speed rotor blades along the radial direction, and wherein the second ring member is positioned outward of the second stage of second speed rotor blades along the radial direction.

10. The method of claim 1, wherein the first stage of rotor blades is a first stage of first speed rotor blades, wherein the gas turbine engine further comprises a first stage of second speed rotor blades, wherein the first stage of first speed rotor blades is configured to rotate in a first circumferential direction, and wherein the first stage of second speed rotor blades is configured to rotate in a second circumferential direction opposite the first circumferential direction.

11. A gas turbine engine defining an axial direction, a radial direction, and a circumferential direction, the gas turbine engine comprising:
- a compressor and a turbine; and
- a rotor blade assembly positioned in the compressor or the turbine, the rotor blade assembly comprising
  - a first stage assembly comprising a first ring member and a first stage of rotor blades, the first ring member defining a first end and the first stage of rotor blades defining a second end;
  - a second stage assembly comprising a second ring member and a second stage of rotor blades, the second ring member defining a first end and the second stage of rotor blades defining a second end, the second end of the first stage of rotor blades and the first end of the second ring member together forming an attachment interface; and
  - a drum member positioned outward of the first and second stage assemblies along the radial direction and clamping the first stage assembly against the second stage assembly.

12. The gas turbine engine of claim 11, wherein the first ring member further defines a second end, wherein the first stage of rotor blades comprises a plurality of segments of one or more first stage rotor blades, wherein each segment of one or more rotor blades comprises an outer platform extending between a first end and a second end generally along the axial direction, and wherein the first end of the outer platform of each segment of one or more rotor blades forms a stage assembly attachment interface with the second end of the first ring member.

13. The gas turbine engine of claim 12, wherein the second end of the first stage assembly is formed of the second ends of the outer platforms of the plurality of segments of one or more first stage rotor blades.

14. The gas turbine engine of claim 12, wherein the first ring member extends completely along the circumferential direction.

15. The gas turbine engine of claim 12, wherein each segment of one or more rotor blades comprises at least 2 rotor blades and up to 15 rotor blades.

16. The gas turbine engine of claim 12, wherein the stage assembly attachment interface is configured as a tongue and groove attachment interface.

17. The gas turbine engine of claim 12, wherein the second ring member further defines a second end, wherein the second stage of rotor blades comprises a plurality of segments of one or more second stage rotor blades, wherein each segment of one or more second stage rotor blades comprises an outer platform extending between a first end and a second end generally along the axial direction, and wherein the first end of the outer platform of each segment of one or more second stage rotor blades forms a stage assembly attachment interface with the second end of the second ring member.

18. The gas turbine engine of claim 11, wherein the first stage of rotor blades is a first stage of first speed rotor blades, wherein the second stage of rotor blades is a second stage of first speed rotor blades, wherein the gas turbine engine further comprises a first stage of second speed rotor blades and a second stage of second speed rotor blades, wherein the first ring member is positioned outward of the first stage of second speed rotor blades along the radial direction, and wherein the second ring member is positioned outward of the second stage of second speed rotor blades along the radial direction.

19. The gas turbine engine of claim 18, wherein the first ring member surrounds the first stage of second speed rotor blades along the circumferential direction, and wherein the second ring member surrounds the second stage of second speed rotor blades along the circumferential direction.

20. The gas turbine engine of claim 11, wherein first stage of rotor blades is a first stage of first speed rotor blades, wherein the second stage of rotor blades is a second stage of first speed rotor blades, wherein the gas turbine engine further comprises a plurality of second speed rotor blades coupled to a first section of second speed rotor disks and a second section of second speed rotor disks, and wherein the rotor blade assembly further comprises a blisk coupled to one of the first stage assembly or the second stage assembly and positioned between the first and second sections of second speed rotor disks along the axial direction.

* * * * *